(12) United States Patent
Chatterjee et al.

(10) Patent No.: US 11,637,656 B2
(45) Date of Patent: Apr. 25, 2023

(54) MECHANISM FOR TRANSMISSION AND RECEPTION OF DEMODULATION REFERENCE SIGNAL

(71) Applicant: Apple Inc., Cupertino, CA (US)

(72) Inventors: Debdeep Chatterjee, San Jose, CA (US); Hong He, Beijing (CN); Gang Xiong, Beaverton, OR (US); Ajit Nimbalker, Fremont, CA (US); Dmitry Dikarev, Nizhny Novgorod (RU); Yongjun Kwak, Portland, OR (US)

(73) Assignee: Apple Inc., Cupertino, CA (US)

( * ) Notice: Subject to any disclaimer, the term of this patent is extended or adjusted under 35 U.S.C. 154(b) by 88 days.

(21) Appl. No.: 17/197,596

(22) Filed: Mar. 10, 2021

(65) Prior Publication Data
US 2021/0194626 A1 Jun. 24, 2021

Related U.S. Application Data

(62) Division of application No. 16/126,776, filed on Sep. 10, 2018, now Pat. No. 11,121,808.
(Continued)

(51) Int. Cl.
*H03M 13/00* (2006.01)
*H04L 1/00* (2006.01)
(Continued)

(52) U.S. Cl.
CPC .......... *H04L 1/0058* (2013.01); *H04L 1/0041* (2013.01); *H04L 1/0057* (2013.01);
(Continued)

(58) Field of Classification Search
CPC ... H04L 1/0041; H04L 1/0057; H04L 1/0058; H04L 1/0061; H04L 5/0007;
(Continued)

(56) References Cited

U.S. PATENT DOCUMENTS

| 8,189,557 B2 * | 5/2012 | Onggosanusi ....... H04J 11/0069 370/310 |
| 2012/0176885 A1 * | 7/2012 | Lee ....................... H04L 5/0007 370/209 |

(Continued)

OTHER PUBLICATIONS

3GPP TS 38.211 V1.0.0; 3rd Generation Partnership Project; Technical Specification Group Radio Access Network; NR; Physical channels and modulation (Release 15), Valbonne—France, Sep. 7, 2017, 37 pgs.

(Continued)

*Primary Examiner* — Albert Decady
*Assistant Examiner* — Enamul M Kabir
(74) *Attorney, Agent, or Firm* — Kowert, Hood, Munyon, Rankin & Goetzel, P.C.

(57) ABSTRACT

Provided herein are method and apparatus for channel coding in the fifth Generation (5G) New Radio (NR) system. An embodiment provides an apparatus for a Next Generation NodeB (gNB), including circuitry, which is configured to: generate Downlink Control Information (DCI) payload for a NR-Physical Downlink Control Channel (NR-PDCCH); attach Cyclic Redundancy Check (CRC) to the DCI payload; mask the CRC with an Radio Network Temporary Identifier (RNTI) using a bitwise modulus 2 addition operation, wherein the number of bits for the RNTI is different from the number of bits for the CRC; and perform polar encoding for the DCI payload with the masked CRC.

20 Claims, 30 Drawing Sheets

Related U.S. Application Data

(60) Provisional application No. 62/566,043, filed on Sep. 29, 2017, provisional application No. 62/557,015, filed on Sep. 11, 2017, provisional application No. 62/556,156, filed on Sep. 8, 2017.

(51) Int. Cl.
*H04W 72/04* (2023.01)
*H04L 5/00* (2006.01)

(52) U.S. Cl.
CPC .......... *H04L 1/0061* (2013.01); *H04L 5/0044* (2013.01); *H04L 5/0051* (2013.01); *H04W 72/042* (2013.01); *H04L 5/0007* (2013.01); *H04L 5/0053* (2013.01)

(58) Field of Classification Search
CPC ... H04L 5/0044; H04L 5/0051; H04L 5/0053; H04W 72/042
USPC ......................................................... 714/776
See application file for complete search history.

(56) References Cited

U.S. PATENT DOCUMENTS

| | | | |
|---|---|---|---|
| 2013/0039284 A1* | 2/2013 | Marinier | H04L 5/001 370/329 |
| 2014/0004857 A1 | 1/2014 | Rune et al. | |
| 2016/0081011 A1 | 3/2016 | Cui et al. | |
| 2016/0119094 A1* | 4/2016 | Varadarajan | H04L 5/0048 375/295 |
| 2016/0135240 A1* | 5/2016 | Yoon | H04W 8/005 370/329 |
| 2016/0255609 A1 | 9/2016 | Kim et al. | |
| 2016/0285595 A1 | 9/2016 | Chen et al. | |
| 2016/0338111 A1 | 11/2016 | Han et al. | |
| 2017/0127316 A1 | 5/2017 | Chen et al. | |
| 2017/0237586 A1 | 8/2017 | Liu et al. | |
| 2017/0366199 A1 | 12/2017 | Ge et al. | |
| 2018/0048418 A1 | 2/2018 | Ge et al. | |
| 2018/0123769 A1 | 5/2018 | Pelletier et al. | |
| 2018/0184410 A1 | 6/2018 | Wilson et al. | |
| 2019/0014562 A1 | 1/2019 | Yasukawa et al. | |
| 2019/0053270 A1* | 2/2019 | Akoum | H04L 5/0044 |
| 2019/0075543 A1* | 3/2019 | Kim | H04L 5/00 |
| 2019/0089504 A1* | 3/2019 | Hwang | H04L 27/26 |
| 2019/0158170 A1* | 5/2019 | Seo | H04J 11/0026 |
| 2020/0162228 A1* | 5/2020 | Gao | H04W 72/0466 |
| 2020/0163062 A1 | 5/2020 | Takeda et al. | |
| 2020/0205185 A1 | 6/2020 | Zhu | |
| 2020/0213065 A1* | 7/2020 | Takeda | H04L 5/0053 |
| 2021/0099979 A1 | 4/2021 | Takeda et al. | |
| 2021/0120537 A1 | 4/2021 | Lei et al. | |
| 2021/0144714 A1 | 5/2021 | Takeda et al. | |
| 2021/0168844 A1* | 6/2021 | Takeda | H04L 27/26 |
| 2021/0185706 A1* | 6/2021 | Park | H04W 72/04 |

OTHER PUBLICATIONS

3GPP TS 38.211 V15.2.0; 3rd Generation Partnership Project; Technical Specification Group Radio Access Network; NR; Physical channels and modulation (Release 15), Valbonne—France, Jun. 29, 2018, 96 pgs.

3GPP TS 38.212 V1.0.0; 3rd Generation Partnership Project; Technical Specification Group Radio Access Network; NR; Multiplexing and channel coding (Release 15); Valbonne—France, Sep. 7, 2017, 28 pgs.

3GPP TS 38.212 V15.2.0; 3rd Generation Partnership Project; Technical Specification Group Radio Access Network; NR; Multiplexing and channel coding (Release 15), Valbonne—France, Jun. 29, 2018, 98 pgs.

3GPP TS 38.300 V1.0.0; 3rd Generation Partnership Project; Technical Specification Group Radio Access Network; NR; NR and NG-RAN Overall Description; Stage 2 (Release 15), Valbonne—France, Sep. 1, 2017, 59 pgs.

3GPP TS 38.300 V15.2.0; 3rd Generation Partnership Project; Technical Specification Group Radio Access Network; NR; NR and NG-RAN Overall Description; Stage 2 (Release 15), Valbonne—France, Jun. 20, 2018, 87 pgs.

3GPP TS 38.331 V15.2.1; 3rd Generation Partnership Project; Technical Specification Group Radio Access Network; NR; Radio Resource Control (RRC) protocol specification (Release 15), Valbonne—France, Jun. 21, 2018, 303 pgs.

3GPP TS 38.331 V0.0.5; 3rd Generation Partnership Project; Technical Specification Group Radio Access Network; NR; Radio Resource Control (RRC); Protocol specification (Release 15), Valbonne—France, Aug. 10, 2017, 38 pgs.

* cited by examiner

MECHANISM FOR TRANSMISSION AND RECEPTION OF DEMODULATION REFERENCE SIGNAL

CROSS REFERENCES TO RELATED APPLICATIONS

This application is a divisional of U.S. patent application Ser. No. 16/126,776, filed Sep. 10, 2018, titled "Method and Apparatus for Channel Coding in the Fifth Generation New Radio System", which claims the benefit of priority to: U.S. Provisional Patent Application Ser. No. 62/556,156 filed on Sep. 8, 2017, U.S. Provisional Patent Application Ser. No. 62/557,015 filed on Sep. 11, 2017, and U.S. Provisional Patent Application Ser. No. 62/566,043 filed on Sep. 29, 2017. All of the aforementioned Applications are incorporated by reference in their entireties.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

TECHNICAL FIELD

Embodiments of the present disclosure generally relate to the field of wireless communication, and in particular to a method and an apparatus for channel coding in the $5^{th}$ Generation (5G) New Radio (NR) system.

BACKGROUND ART

Mobile communication has evolved significantly from early voice systems to today's highly sophisticated integrated communication platform. The next generation wireless communication system, 5G or NR system will provide access to information and sharing of data anywhere, anytime by various users and applications. NR system is expected to be a unified network or system that targets to meet vastly different and sometime conflicting performance dimensions and services. Such diverse multi-dimensional requirements are driven by different services and applications. In general, NR system will evolve based on 3GPP LTE-Advanced with additional potential new Radio Access Technologies (RATs) to enrich people lives with better, simple and seamless wireless connectivity solutions. NR system will enable everything connected by wireless and deliver fast, rich contents and services.

In 5G or NR system, Polar code has been selected for channel coding for uplink and downlink control information. Polar code is a linear block code based on phenomena known as channel polarization. The code construction is based on a multiple recursive concatenation of a short kernel code which transforms the physical channel into virtual outer channels. When the number of recursions becomes large, the virtual channels tend to either have high reliability or low reliability (in other words, they polarize), and the data bits are allocated to the most reliable channels. It is the first known code that provably achieves the Shannon's capacity. Notably, Polar Code have modest encoding and decoding complexity, which renders them attractive for many applications.

SUMMARY

An embodiment of the disclosure provides an apparatus for a Next Generation NodeB (gNB) including circuitry configured to generate Downlink Control Information (DCI) payload for a NR-Physical Downlink Control Channel (NR-PDCCH); attach Cyclic Redundancy Check (CRC) to the DCI payload, mask the CRC with an Radio Network Temporary Identifier (RNTI) using a bitwise modulus 2 addition operation, wherein the number of bits for the RNTI is different from the number of bits for the CRC; and perform polar encoding for the DCI payload with the masked CRC.

Another embodiment of the disclosure provides an apparatus for a Next Generation NodeB (gNB), including circuitry configured to: generate a Demodulation Reference Signal (DMRS) sequence based on a Pseudo-Noise (PN) sequence; and map the generated DMRS sequence onto a configured control resource set (CORESET) starting from the PRB of the lowest frequency and mapping to resources in units of PRBs in an increasing frequency order.

Another embodiment of the disclosure provides an apparatus for a User Equipment (UE), including circuitry configured to acquire information of control resource configuration associated with the UE, wherein the control resource configuration comprising one or more identifiers; acquire information of search space configuration of the UE which is associated with the control resource configuration, wherein the search space information includes a field indicating a first identifier of the one or more identifiers applied for determining at least one control resource candidate for the search space, and a field indicating a second identifier of the one or more identifiers applied for scrambling initialization of the at least one control resource candidate of the search space; determine the at least one control resource candidate based on the first identifier; determine the scrambling initialization for the at least one control resource candidate of the search space based on the second identifier; descramble the at least one control resource candidate of the search space based on the determined scrambling initialization; and decode said descrambled control resource candidate of the search space.

Another embodiment of the disclosure provides an apparatus for a Next Generation NodeB (gNB), including circuitry configured to determine control resource configuration associated a User Equipment (UE), wherein the control resource information comprising one or more identifiers; determine search space configuration of the UE which is associated with the control resource information, wherein the search space configuration comprises a field indicating a first identifier of the one or more identifiers applied for determining at least one control resource candidate for the search space, and a field indication a second identifier of the one or more identifiers applied for scrambling initialization of the at least one control resource candidate of the search space; encode the at least one control resource candidate of the search space with the first identifier; determine the scrambling initialization for the at least one control resource candidate of the search space based on the second identifier; scramble control information for the UE based on the determined scrambling initialization; and transmit the scrambled control information on the at least one control resource candidate of the search space.

Another embodiment of the disclosure provides an apparatus for a Next Generation NodeB (gNB), including circuitry configured to generate an information block for Physical Broadcast Channel (PBCH); attach the information block with Cyclic Redundancy Check (CRC) bits; interleave, by an interleaver of the gNB, the information block attached with the CRC bits to enable early decoding of a part of the information block at User Equipment (UE) side, wherein the part of the information block is portion of Synchronization Signal (SS) block index; encode the interleaved information block with Polar codes; and transmit the encoded information block for decoding at UE side.

Another embodiment of the disclosure provides an apparatus for a User Equipment (UE), including circuitry configured to receive an information block for Physical Broadcast Channel (PBCH) which is encoded with Polar codes from a Next Generation NodeB (gNB); decode, by a polar decoder of the UE, the information block in a decoding order to obtain an estimate of a part of the information block, wherein the part of the information block is portion of a Synchronization Signal (SS) block index; and stop decoding of the remaining portion of the information block after the estimate of the part of information block is obtained.

BRIEF DESCRIPTION OF THE DRAWINGS

Embodiments of the disclosure will be illustrated, by way of example and not limitation, in the figures of the accompanying drawings in which like reference numerals refer to similar elements.

DETAILED DESCRIPTION OF EMBODIMENTS

Various aspects of the illustrative embodiments will be described using terms commonly employed by those skilled in the art to convey the substance of their work to others skilled in the art. However, it will be apparent to those skilled in the art that many alternate embodiments may be practiced using portions of the described aspects. For purposes of explanation, specific numbers, materials, and configurations are set forth in order to provide a thorough understanding of the illustrative embodiments. However, it will be apparent to those skilled in the art that alternate embodiments may be practiced without the specific details. In other instances, well known features may have been omitted or simplified in order to avoid obscuring the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in an embodiment" is used repeatedly herein. The phrase generally does not refer to the same embodiment; however, it may. The terms "comprising," "having," and "including" are synonymous, unless the context dictates otherwise. The phrases "A or B" and "A/B" mean "(A), (B), or (A and B)."

Figure 1:
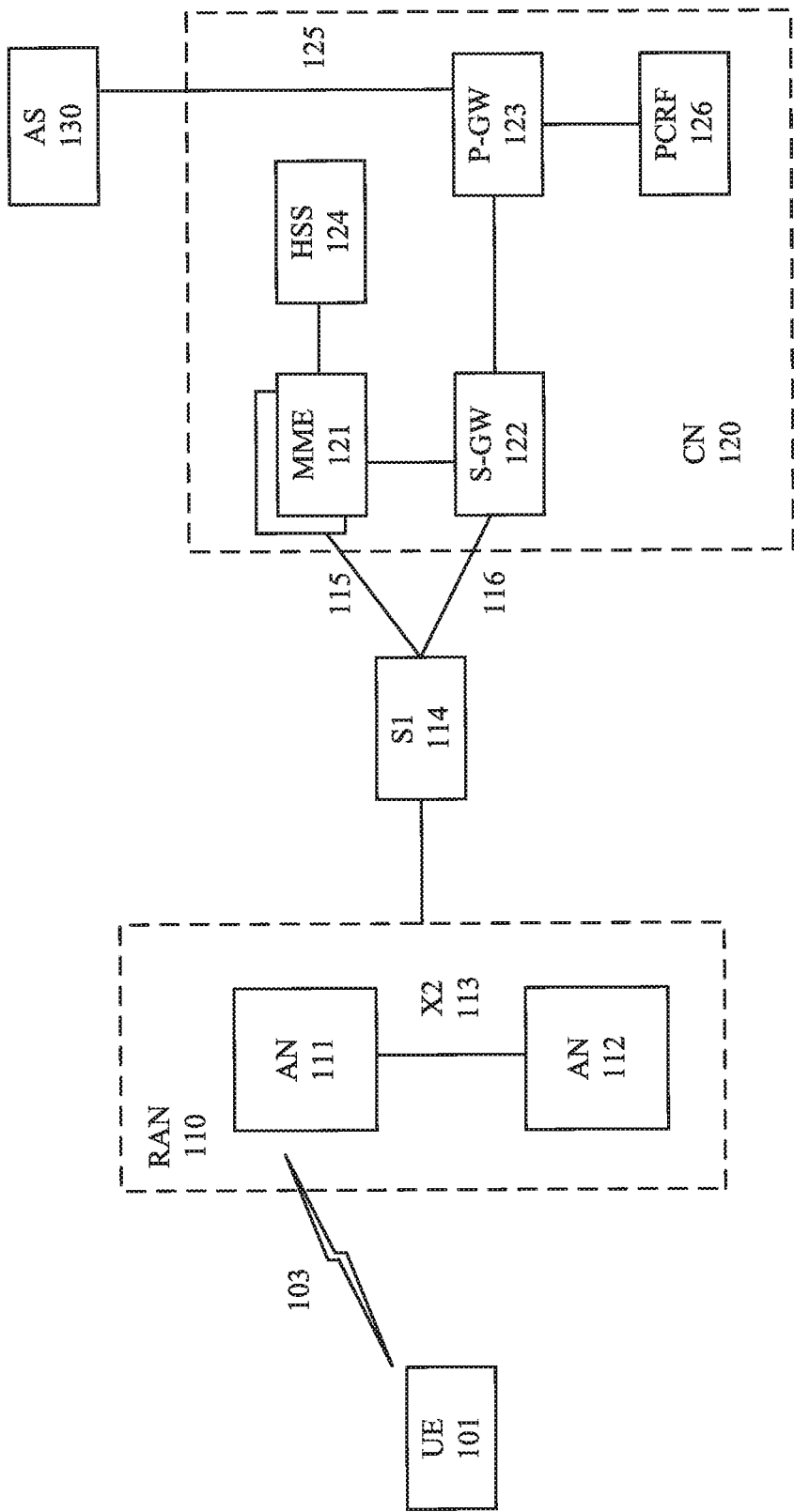
FIG. 1 is a diagram of an example environment in which apparatuses and/or methods described herein may be implemented.

FIG. 1 illustrates an architecture of a system 100 of a network in accordance with some embodiments. The system 100 is shown to include a user equipment (UE) 101. The UE 101 is illustrated as a smartphone (e.g., handheld touchscreen mobile computing devices connectable to one or more cellular networks), but may also include any mobile or non-mobile computing device, such as a personal data assistant (PDA), a tablet, a pager, a laptop computer, a desktop computer, a wireless handset, or any computing device including a wireless communications interface.

The UE 101 may be configured to connect, e.g., communicatively couple, with a radio access network (RAN) 110, which may be, for example, an Evolved Universal Mobile Telecommunications System (UMTS) Terrestrial Radio Access Network (E-UTRAN), a Next Gen RAN (NG RAN), or some other type of RAN. The UE 101 may utilize a connection 103 which comprises a physical communications interface or layer (discussed in further detail below); in this example, the connection 103 is illustrated as an air interface to enable communicative coupling and may be consistent with cellular communications protocols, such as a Global System for Mobile Communications (GSM) protocol, a Code-Division Multiple Access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

The RAN 110 may include one or more access nodes (ANs) that enable the connection 103. These access nodes may be referred to as base stations (BSs), NodeBs, evolved NodeBs (eNBs), next Generation NodeBs (gNB), RAN nodes, and so forth, and may include ground stations (e.g., terrestrial access points) or satellite stations providing coverage within a geographic area (e.g., a cell). As shown in FIG. 1, for example, the RAN 110 may include AN 111 and AN 112. The AN 111 and AN 112 may communicate with one another via an X2 interface 113. The AN 111 and AN 112 may be macro ANs which may provide lager coverage. Alternatively, they may be femtocell ANs or picocell ANs, which may provide smaller coverage areas, smaller user capacity, or higher bandwidth compared to macro ANs. For example, one or both of the AN 111 and AN 112 may be a low power (LP) AN. In an embodiment, the AN 111 and AN 112 may be the same type of AN. In another embodiment, they are different types of ANs.

Any of the ANs 111 and 112 may terminate the air interface protocol and may be the first point of contact for the UE 101. In some embodiments, any of the ANs 111 and 112 may fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UE 101 may be configured to communicate using Orthogonal Frequency-Division Multiplexing (OFDM) communication signals with any of the ANs 111 and 112 or with other UEs (not shown) over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and Proximity-Based Service (ProSe) or sidelink communications), although the scope of the embodiments is not limited in this respect. The OFDM signals may include a plurality of orthogonal subcarriers.

In some embodiments, a downlink resource grid may be used for downlink transmissions from any of the ANs 111 and 112 to the UE 101, while uplink transmissions may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 101. The physical downlink control channel (PDCCH) may carry information about the transport format and resource allocations related to the PDSCH channel, among other things. It may also inform the UE 101 about the transport format, resource allocation, and H-ARQ (Hybrid Automatic Repeat Request) information related to the uplink shared channel. Typically, downlink scheduling (assigning control and shared channel resource blocks to the UE 101 within a cell) may be performed at any of the ANs 111 and 112 based on channel quality information fed back from the UE 101. The downlink resource assignment information may be sent on the PDCCH used for (e.g., assigned to) the UE 101.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH may be transmitted using one or more CCEs, depending on the size of the downlink control information (DCI) and the channel condition. There may be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120 via an S1 interface 114. In some embodiments, the CN 120 may be an evolved packet core (EPC) network, a NextGen Packet Core (NPC) network, or some other type of CN. In an embodiment, the S1 interface 114 is split into two parts: the S1-mobility management entity (MME) interface 115, which is a signaling interface between the ANs 111 and 112 and MMEs 121; and the S1-U interface 116, which carries traffic data between the ANs 111 and 112 and the serving gateway (S-GW) 122.

In an embodiment, the CN 120 may comprise the MMEs 121, the S-GW 122, a Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-AN handovers and also may provide an anchor for inter-3GPP mobility. Other responsibilities may include lawful intercept, charging, and some policy enforcement.

The P-GW 123 may terminate a SGi interface toward a PDN. The P-GW 123 may route data packets between the CN 120 and external networks such as a network including an application server (AS) 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In an embodiment, the P-GW 123 is communicatively coupled to an application server 130 via an IP communications interface 125. The application server 130 may also be configured to support one or more communication services (e.g., Voice-over-Internet Protocol (VoIP) sessions, PTT sessions, group communication sessions, social networking services, etc.) for the UE 101 via the CN 120.

The P-GW 123 may further be a node for policy enforcement and charging data collection. Policy and Charging Enforcement Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

The quantity of devices and/or networks illustrated in FIG. 1 is provided for explanatory purposes only. In practice, there may be additional devices and/or networks, fewer devices and/or networks, different devices and/or networks, or differently arranged devices and/or networks than illustrated in FIG. 1. Alternatively or additionally, one or more of the devices of environment 100 may perform one or more functions described as being performed by another one or more of the devices of environment 100. Furthermore, while "direct" connections are shown in FIG. 1, these connections should be interpreted as logical communication pathways, and in practice, one or more intervening devices (e.g., routers, gateways, modems, switches, hubs, etc.) may be present.

As defined in New Radio (NR), a control resource set (CORESET) is defined as a set of resource element groups (REG) with one or more symbol duration under a given numerology (e.g., subcarrier spacing and symbol length) within which UE attempts to blindly decode downlink control information (DCI) carried in NR PDCCH which is the PDCCH for 5G or NR systems. For CORESET configuration, in frequency domain, a CORESET can be contiguous or non-contiguous; while in time domain, a CORESET can be configured with one symbol or a set of contiguous OFDM symbols. In addition, for large carrier bandwidth, maximum CORESET duration in time can be, for example, 2 symbols, while for narrow carrier bandwidth, maximum CORESET duration in time can be, for example, 3 symbols with the motivation of increasing NR physical downlink control channel (PDCCH) capacity. Further, as agreed in NR, either time-first or frequency first REG-to-control channel element (CCE) mapping is supported for NR PDCCH.

Figure 2:
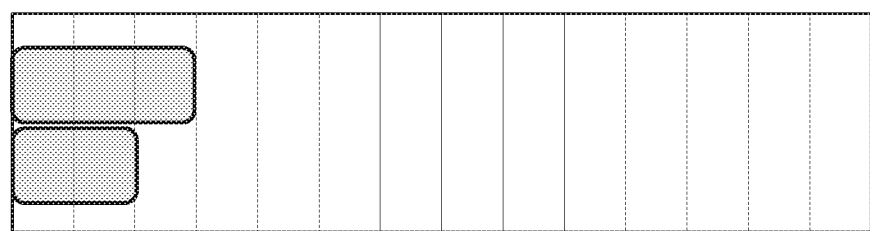
FIG. 2 illustrates an exemplary slot-level CORESET and an exemplary symbol-level CORESET.
Figure 2:
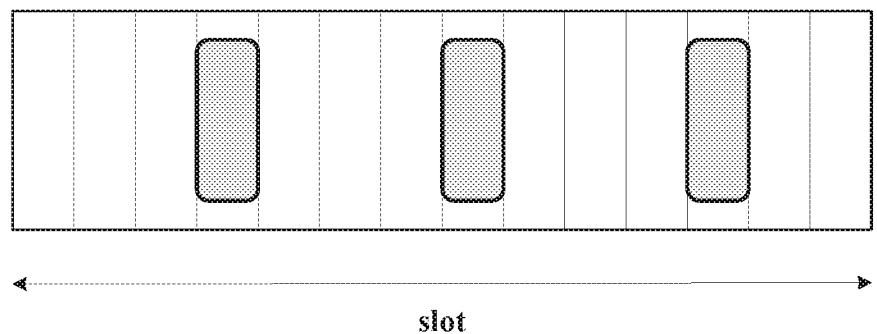

As agreed in NR, a User Equipment (UE) can be configured to monitor DL control channel per 1 symbol with respect to the numerology of the DL control channel. Note that the UE may be configured with symbol-level or slot-level CORESET with certain offset and periodicity in one slot for DL control channel monitoring occasions, as shown in FIG. 2, which illustrates an exemplary slot-level CORESET and an exemplary symbol-level CORESET. Configuring UE with a slot-level CORESET or a symbol-level CORESET may depend on UE capability or service type, e.g., the support of enhanced Mobile BroadBand (eMBB) and Ultra Reliable & Low Latency Communication (URLLC) application.

Figure 3:
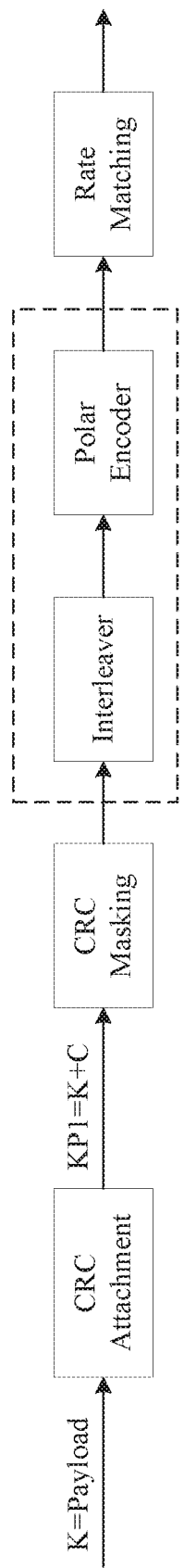
FIG. 3 illustrates an exemplary processing chain for NR PDCCH in a Next Generation NodeB (gNB) in accordance with some embodiments of the disclosure.

An exemplary processing chain for NR PDCCH performed by gNB is shown in FIG. 3. As shown, in order to reduce false alarm rate of NR-PDCCH decoding at UE side, the gNB may be configured to attach the payload K, e.g., Downlink Control Information (DCI) payload, with Cyclic Redundancy Check (CRC) bits, and then mask the CRC bits with UE ID or Radio Network Temporary Identifier (RNTI), note that UE ID and RNTI here may be used interchangeably. The CRC masking with UEID or RNTI may denote the step of applying an exclusive OR (XOR) operation for UE ID or RNTI with CRC bits. After the CRC masking, the payload with the masked CRC may be transmitted to an interleaver which may distribute the payload and/or the masked CRC. In one embodiment, the interleaver may move some CRC bits to early positions to assist in early termination of decoding. Followed the interleaving, polar coding may be performed by a polar encoder, e.g., to obtain frozen bit and information bit mapping based on a pre-determined reliability sequence. Some other operations such as rate-matching may be further performed, so as to transmit the payload to UE(s) effectively.

For NR, it was agreed that false alarm target equivalent to 21-bit CRC is supported for NR PDCCH. In this case, with 3 additional bits used for list decoding of polar codes, it is envisioned that the total number of CRC bits would be 24. Note that it is not decided the number of bits for RNTI for NR. The number of bits for RNTI may be different from the number of bits for CRC with false alarm target, i.e., 21 bits.

In this case, when the CRC is masked with the RNTI, certain mechanism may need to be defined to ensure alignment on the RNTI positions between gNB and UE for proper decoding.

Figure 4:
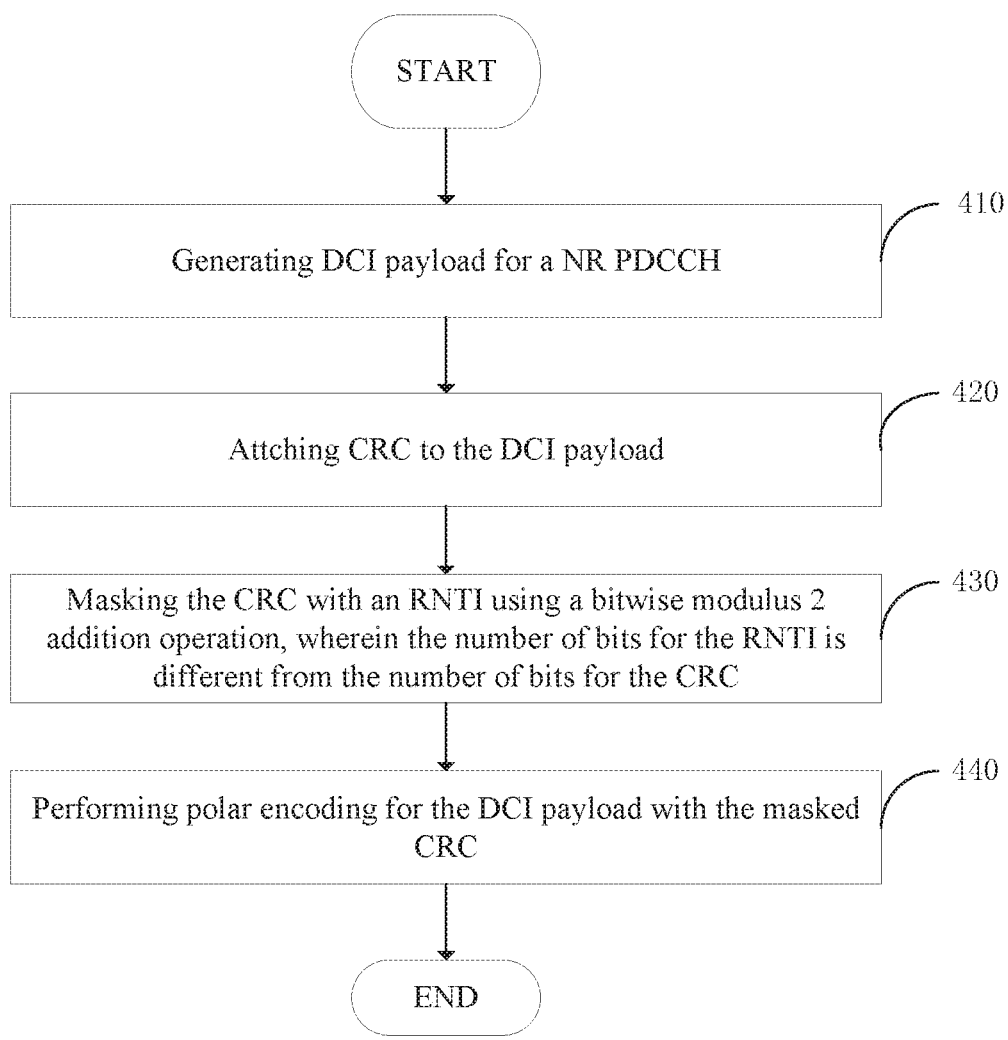
FIG. 4 illustrates a flow chart of a method for encoding NR PDCCH in accordance with some embodiments of the disclosure.

FIG. 4 illustrates a flow chart of a method for encoding NR PDCCH in accordance with some embodiments of the disclosure. The method may be applied to or performed by a gNB. At 410, the gNB may generate DCI payload for a NR PDCCH. At 420, the gNB may attach CRC to the DCI payload. At 430, the gNB may mask the CRC with a RNTI or UEID using a bitwise modulus 2 addition operation, wherein the number of bits for the RNTI may be different from the number of bits for the CRC. At step 440, the gNB may perform polar encoding for the DCI payload with the masked CRC. In an example, a Polar encoder in the eNB may be configured to perform the polar encoding operation.

In some embodiments, the number of bits for the RNTI may be less than the number of bits for the CRC. For example, if 16 bits RNTI as defined in LTE is specified for NR, the number of bits for RNTI is less than the number of bits for CRC with false alarm target, i.e., 21 bits. In this case, the RNTI may be extended by repeating a plurality of the RNTI bits to obtain a scrambling sequence for CRC masking. For example, assuming a N-bit CRC, a shorter RNTI sequence of length S, where S<N, may be extended by repeating several bits of the RNTI to obtaining a scrambling sequence of length N.

In some embodiments, when the number of bits for the RNTI is less than the number of bits for the CRC, for example, a predetermined sequence or aggregation level (AL) for transmission of the NR PDCCH may be appended to the RNTI for CRC masking. In an embodiment, the predetermined sequence may be an all zero sequence or an all one sequence.

Figure 5A:
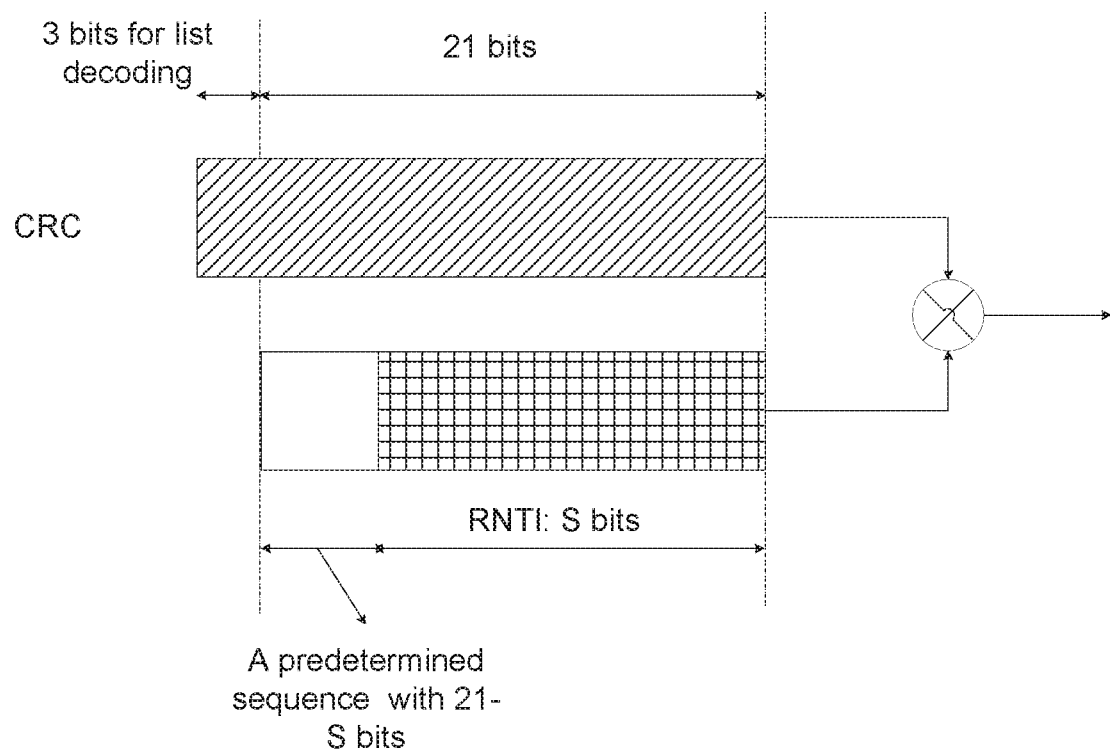
FIG. 5a illustrates an example of CRC masking with RNTI in accordance with some embodiments of the disclosure.

In some embodiments, when the number of bits for the RNTI is less than the number of bits for the CRC, the predetermined sequence is appended prior to the RNTI bits such that the number for the sequence appended RNTI is equal to the number of bits for the CRC. FIG. 5a illustrates an example of CRC masking with RNTI in accordance with some embodiments of the disclosure. As shown in FIG. 5a, a predetermined sequence is appended before the RNTI bits, and the CRC may be masked with the RNTI starting from the least significant bit (LSB) of the CRC, and masked with the predetermined sequence at the remaining bits of the CRC. For example, when CRC with false alarm target (i.e., 21 bits) is masked with a S-bit RNTI sequence (where S<21), the S-bit RNTI sequence may be used to mask the S LBS bits of the CRC, and a predetermined sequence (e.g., an all zero sequence) bits may be appended prior to the RNTI bits for making the (21-S) most significant bit (MSB) bits of the CRC.

Figure 5B:
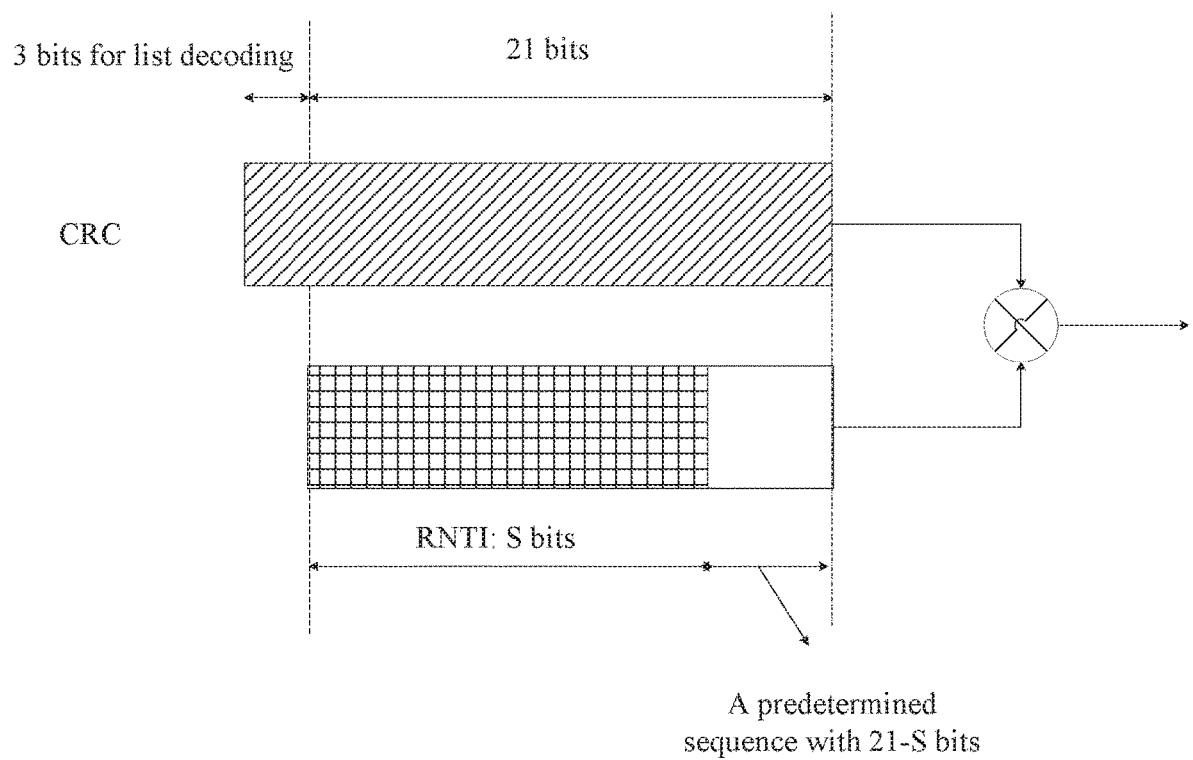
FIG. 5b illustrates another example of CRC masking with RNTI in accordance with some embodiments of the disclosure.

In some embodiments, when the number of bits for the RNTI is less than the number of bits for the CRC, the predetermined sequence is appended after the RNTI bits such that the number for the sequence appended RNTI is equal to the number of bits for the CRC. FIG. 5b illustrates another example of CRC masking with RNTI in accordance with some embodiments of the disclosure. As shown in FIG. 5b, a predetermined sequence is appended following the RNTI bits, and CRC is masked with the RNTI starting from the MSB bits of the CRC, and masked with the predetermined sequence at the remaining bits of the CRC. For example, when CRC with false alarm target (i.e., 21 bits) is masked with a S-bit RNTI sequence (where S<21), the S-bit RNTI sequence may be used to mask the S LBSs of the CRC, and a predetermined sequence (e.g., an all zero sequence) with (21-S) bits may be appended following the RNTI bits for masking the (21-S) LSB bits of the CRC.

In some embodiments, the location of RNTI may be predefined in the specification or configured by higher layers via NR minimum system information (MSI), NR remaining minimum system information (RMSI), NR other system information (OSI) or radio resource control (RRC) signaling. In one example, the RNTI may be distributed within the CRC with false alarm target, i.e., 21 bits. Given that the location of RNTI is known at UE side, UE can perform blind decoding of NR PDCCH without increasing the complexity.

Figure 5C:
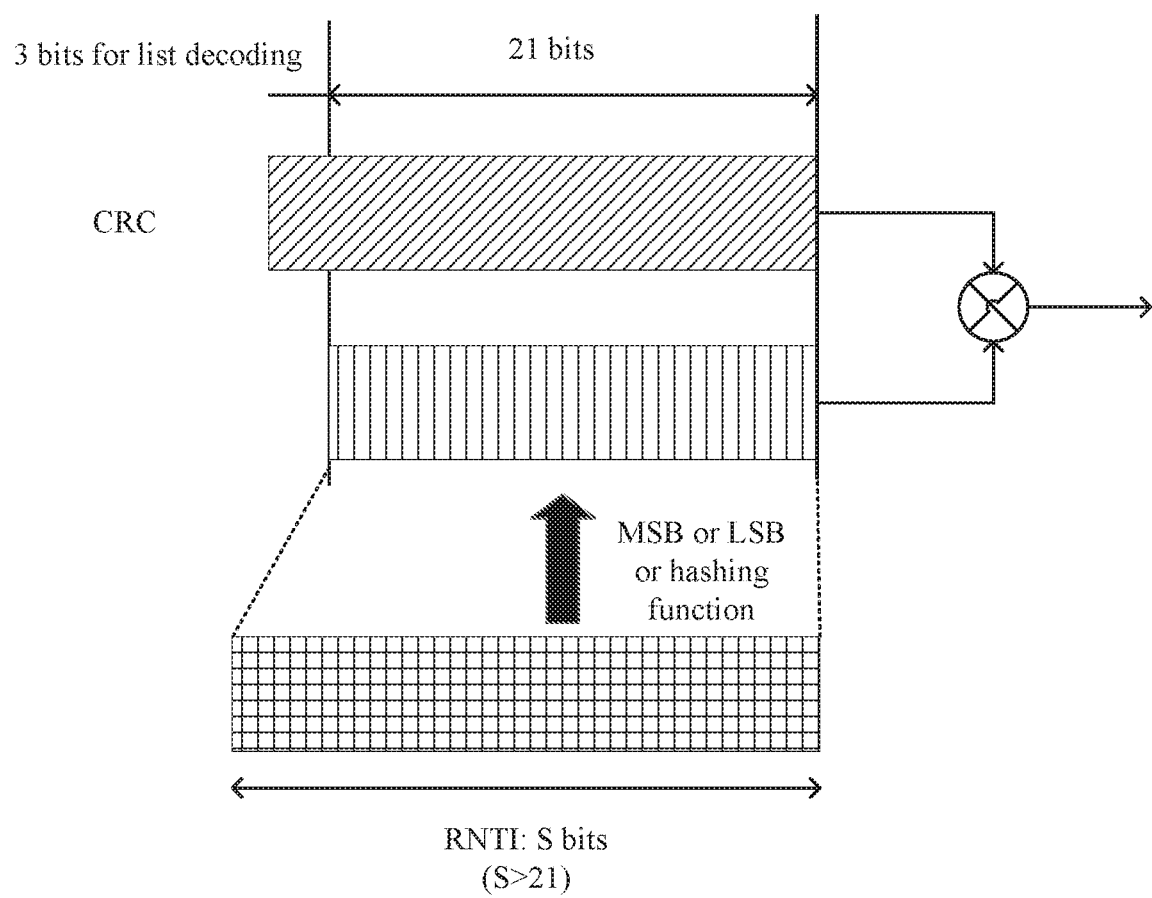
FIG. 5c illustrates another example of CRC masking with RNTI in accordance with some embodiments of the disclosure.

In some embodiments, when the number of bits for the RNTI is larger than the number of bits for the CRC, the CRC may be masked with a portion of the RNTI, the portion of the RNTI may have the same bit number with the CRC. For example, assuming an N-bit CRC (e.g., 21 bits) and a longer RNTI sequence of length S, where S>N. In an example, the portion of the RNTI may be the N MSB bits of the RNTI sequence. In another example, the portion of the RNTI may be the N LSB bits of the RNTI sequence. In yet another example, a hashing function can be defined for making N bits out of the S bits RNTI and the output of the hashing function can be used for CRC masking. As shown in FIG. 5c, which illustrates an example of CRC masking with RNTI in accordance with various embodiments of the disclosure, when a longer RNTI sequence used to mask the CRC with false alarm target (i.e., 21 bits), the 21 LSB bits or the 21 MSB bits of the RNTI bits or 21 bits selected from the RNTI bits with a hashing function may be used for CRC masking.

Figure 6:
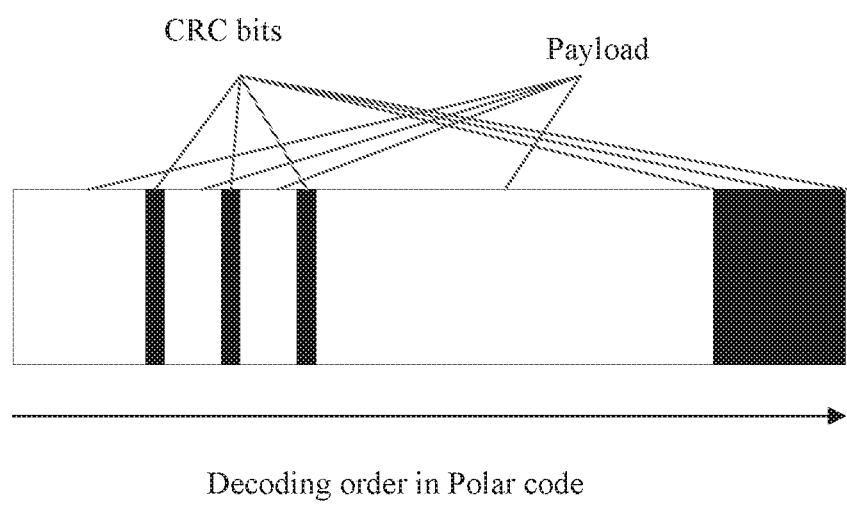
FIG. 6 illustrates an example of distributed CRC in accordance with some embodiments of the disclosure.

In some embodiments, RNTI may be masked onto those CRC bits which may appear relatively later in the decoding order of Polar decoding. An example of distributed CRC is shown in FIG. 6 and the order of mapping onto Polar encoder input is also indicated. In this case, the RNTI may be masked onto those CRC bits that appear in the end of decoding order. This allows the leading CRC bits in the decoding order to be relatively independent of the RNTI mask or masks, and hence such CRC bits can be checked in the Polar list decoding and early termination can be achieved (e.g. if all paths fail to satisfy CRC check). If UE is checking for multiple RNTIs, then the leading CRC bits in decoding order may not yield any early termination benefit because UE has to check CRC with multiple RNTI hypothesis, which may yield surviving path.

When RNTI length is increased from e.g. 16 to 24, then potentially the RNTI mask applies to all CRC bits and hence early termination may not be feasible at all. To avoid such kind of cases, other possibilities can be adopted.

In some embodiments, a first portion of the RNTI may be masked onto a portion of the CRC, and a second portion of the RNTI may be embedded explicitly in the payload. In an embodiment, for UE-specific RNTI(s), some RNTI assignment scheme may be assumed, for example, the UE-specific RNTIs may be selected to have same values for the MSB bits of the CRC, RNTI planning may be undesirable.

In some embodiments. RNTI length may be kept small, but for difference UE-specific messages, a single RNTI may be used, which providing explicit field in the DCI to indicate the type of the functionality for which the message is intended. For example, if the field is 00, it may indicate the grant is intended for first type (regular scheduling), if the field is 01, it may indicate a SPS grant, if it is 10, it may indicate yet another grant type.

In some embodiments, at least a portion of a first RNTI may be embedded into one or more frozen bit locations applied for Polar code, and at least a portion of a second RNTI may be masked onto the CRC. The first RNTI may be a Cell-RNTI (C-RNTI), and the second RNTI may be Semi-Persistent Scheduling RNTI (SPS-RNTI) or Grant free RNTI (GF-RNTI), etc. In an embodiment, the portion of the first RNTI is embedded into the one or more frozen bits via a scrambling initializer, wherein the scrambling initializer operates based on the following parameters: a cell ID, a slot index, one or more parameters associated with the control resource set (CORESET) in which the NR PDCCH is located.

Figure 7:
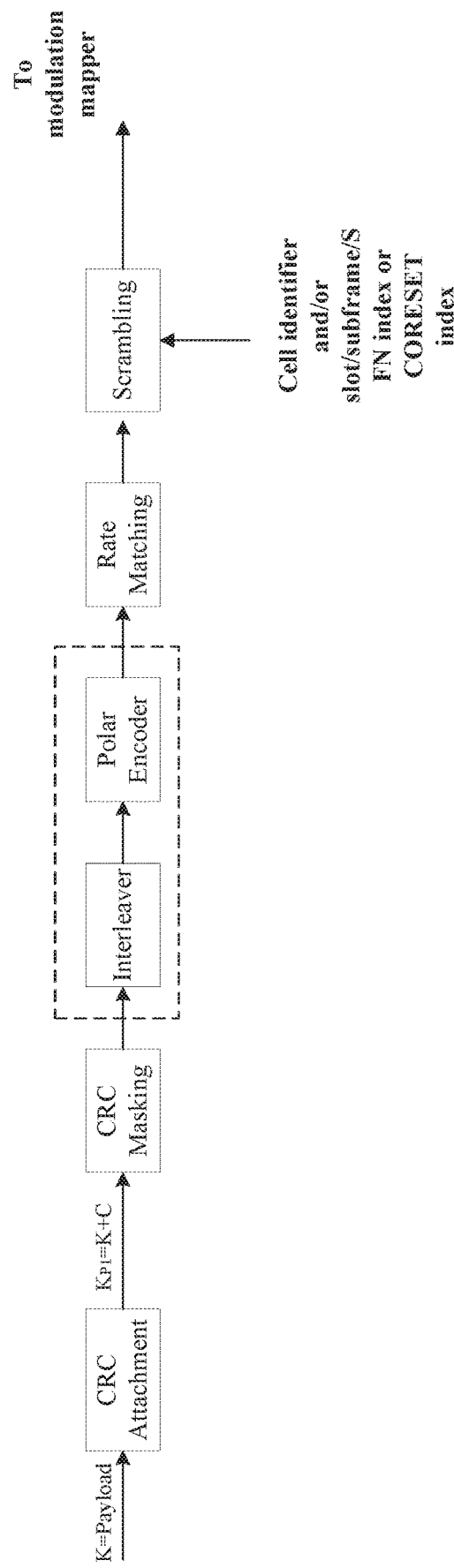
FIG. 7 illustrates another exemplary processing chain for NR PDCCH in a gNB in accordance with some embodiments of the disclosure.

In some embodiments, a scrambling function may further be applied after Polar encoding of the DCI payload with the masked CRC, where the scrambling function is a linear or a non-linear function of one or more of the RNTI, a cell identifier, a slot or subframe or System Frame Number (SFN) index, and a CORESET index. In an example, the scrambling function may be applied post-Polar encoding before the bit selection via rate-matching. In another example, the scrambling function may be applied post-Polar encoding after the bit selection via rate-matching. An example is illustrated in FIG. 7.

In 5G or NR system, a linear feedback shift register (LFSR) may be used for scrambling. An example of scrambling initialization will be described. The block of bits $b(0), \ldots, b(M_{bit}-1)$ to be transmitted on an PDCCH may be scrambled, a block of scrambled bits $\tilde{b}(0), \ldots, \tilde{b}(M_{bit}-1)$ may be generated according to the equation (1):

$$\tilde{b}(i)=(b(i)+c(i)) \bmod 2 \qquad (1)$$

where the scrambling sequence is c(i). In one example, c(i) may be determined according to equation (2):

$$c_{init}=\lfloor n_s/2 \rfloor \cdot 2^9 + n_{scramblingID} \qquad (2)$$

where $n_s$ is a slot index, and $n_{scramblingID}$ is a scrambling identity (ID) value configured for the UE by higher layers.

The scrambling ID value may be determined via CORESET configuration and/or the search space configuration. A UE may be configured to apply the scrambling ID value to be one of a virtual cell identifier, a UE-specific C-RNTI, or a Group-common C-RNTI. In some embodiments, the scrambling initialization may be dependent on one or more identifiers acquired from higher layers, and one or more derived parameters such as slot index, etc.

In some embodiments, the control resource configuration may comprise one or more identifiers, allowing flexible identifiers for scrambling initialization such that a gNB may take advantage of early termination of Polar code based on path metric. For example, if a gNB finds that two UEs' search spaces are overlapped (in at least one candidate), it could configure them with different identifiers for respective Scrambling initialization—in such a case, a first UE will terminate early in polar decoding if it applies a scrambling initialization that is different from that used for transmitting data to the second UE. On the other hand, if gNB find the two search spaces are overlapped (in at least one candidate), it could still configure a single identifier for scrambling initialization, and potentially enable sending common messages to both UEs, or send an individual message to one of the UEs (via RNTI masked on CRC). Thus flexible identifier can provide benefits for the overall system.

An exemplary CORESET configuration is as follows:

```
CORESET Configuration {
    Identifier 1
    Identifier 2
    Identifier 3
    Identifier 4
```
```
    ...other CORESET configuration....
}
```

A first exemplary search space configuration based on the CORESET configuration may be:

```
SearchSpaceConfiguration {
    • CORESET Identifier
    • Apply Identifier 1 for DMRS generation
    • Apply Identifier 2 for scrambling initialization
    • Apply Identifier 3 for UE-specific Search space hashing to identify
      candidates
    • (optional) Identifier 4 for group/common Search space hashing to
      identify candidates for the group/common search space
    • Other search space configuration
}
```

A second exemplary search space configuration based on the CORESET configuration may be:

```
SearchSpaceConfiguration {
    • CORESET Identifier
    • Apply Identifier 1 for DMRS generation
    • Apply Identifier 1 for scrambling initialization
    • Apply Identifier 3 for UE-specific Search space hashing to identify
      candidates
    • (optional) Identifier 4 for Group/common Search space hashing to
      identify candidates for the group/common search space
    • Other search space configuration
}
```

A third exemplary search space configuration based on the CORESET configuration may be:

```
SearchSpaceConfiguration {
    • CORESET Identifier
    • Apply Identifier 1 for DMRS generation
    • Apply Identifier 1 for scrambling initialization
    • Apply Identifier 1 for UE-specific Search space hashing to identify
      candidates
    • (optional) Identifier 4 for Group/common Search space hashing to
      identify candidates for the group/common search space
    • Other search space configuration
}
```

With these configurations, a gNB can flexibly create an UE-specific, cell-specific, group-specific search spaces for different UEs. The flexible identifiers for DMRS/Scrambling initialization/UE-specific search space would allow a gNB to create an overlapped search space for multiple UEs, e.g., two UEs, even if they could individually consider their search space as UE-specific. Within a given candidate in the overlapped search space, the grants for different UEs could still be distinguished by the RNTI masked onto the CRC.

Figure 8:
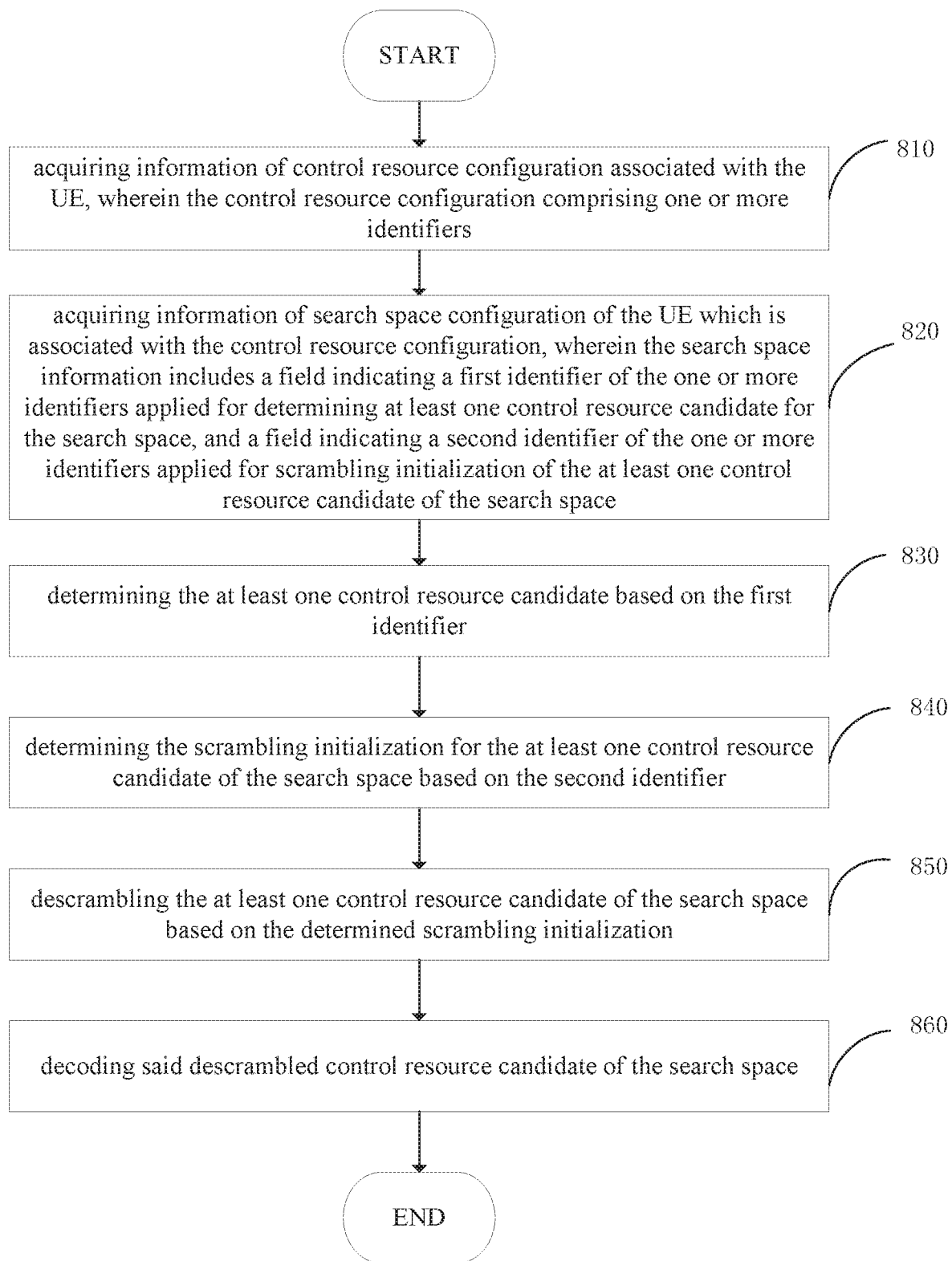
FIG. 8 illustrates a flow chart of a method for channel decoding in accordance with some embodiments of the disclosure.

FIG. 8 illustrates a flow chart of a method for channel decoding in accordance with some embodiments of the disclosure. The method may be applied to or performed by a UE. At 810, the UE may acquire information of control resource (e.g., CORESET) configuration associated with the UE, wherein the control resource configuration may comprise one or more identifiers. At 820, the UE may acquire information of the search space configuration of the UE which is associated with the control resource configuration, wherein the search space information includes a field indicating a first identifier of the one or more identifiers applied for determining at least one control resource candidate for the search space, and a field indicating a second identifier of the one or more identifiers applied for scrambling initialization of the at least one control resource candidate of the search space. At 830, the UE may determine the at least one control resource candidate based on the first identifier. Then the UE may determine scrambling initialization for the at least one control resource candidate based on the second identifier at 840, and descramble the at least one control resource candidate based on the determined scrambling initialization at 850. After the descrambling, the UE may decode the at least one descrambled candidate at 860.

Figure 9:
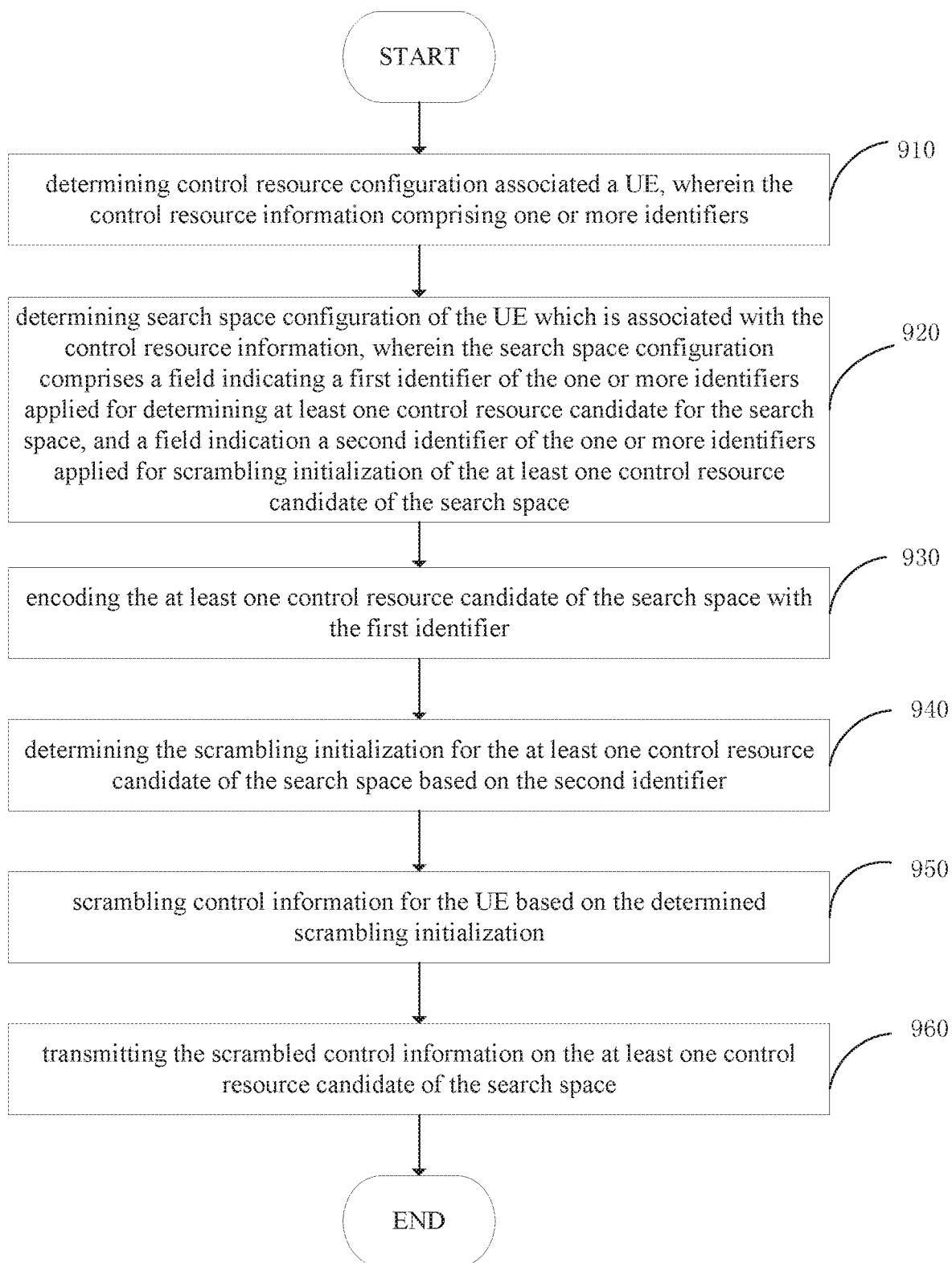
FIG. 9 illustrates a flow chart of a method for channel encoding in accordance with some embodiments of the disclosure.

FIG. 9 illustrates a flow chart of a method for channel encoding in accordance with some embodiments of the disclosure. The method may be applied to or performed by a gNB. At 910, the gNB may determine the information of control resource configuration (e.g., CORESET configuration) associated with a UE, wherein the control resource configuration may comprise one or more identifiers. At 920, the gNB may determine information of the search space configuration of the UE which is associated with the control resource configuration, wherein the search space information includes a field indicating a first identifier of the one or more identifiers applied for determining at least one control resource candidate for the search space, and a field indicating a second identifier of the one or more identifiers applied for scrambling initialization of the at least one control resource candidate of the search space. At 930, the gNB may encode the at least one control resource candidate of the search space with the first identifier. At 940, the gNB may determine the scrambling initialization for the at least one control resource candidate of the search space based on the second identifier and scramble the control information for the UE based on the determined scrambling initialization at 950. Then the gNB may transmit the scrambled control information on the at least one control resource candidate of the search space at 960.

In an embodiment, the first identifier is a Cell-Radio Network Temporary Identifier (C-RNTI) and the second identifier is a virtual cell identifier. In example, the first identifier may be a C-RNTI and second identifier may be one of a virtual cell identifier or a scrambling-RNTI, wherein the second identifier may be determined from the control resource configuration. In another example, the first identifier and the second identifier may be identical, for example, they are both C-RNTI.

In some embodiments, the search space configuration may further comprise a field indicating a third identifier of the one or more identifiers applied for Demodulation Reference Signal (DMRS) generation associated with the at least one control resource candidate. In an example, the DMRS associated with the at least one control resource candidate may be based on the third identifier. In another embodiment, the first, second and third identifiers may be all different or identical. In an embodiment, the first, second and third identifiers may be partially different or identical, for example, the first and second identifiers may be identical, and the third identifier may be different from the first identifier and the second identifier.

For NR, it was agreed that common Physical Resource Block (PRB) indexing and UE-specific PRB indexing are supported. For the latter case, the motivation is to support wider bandwidth operation, where UE is configured with one or more bandwidth parts (BWPs) within the wider bandwidth.

Figure 10:
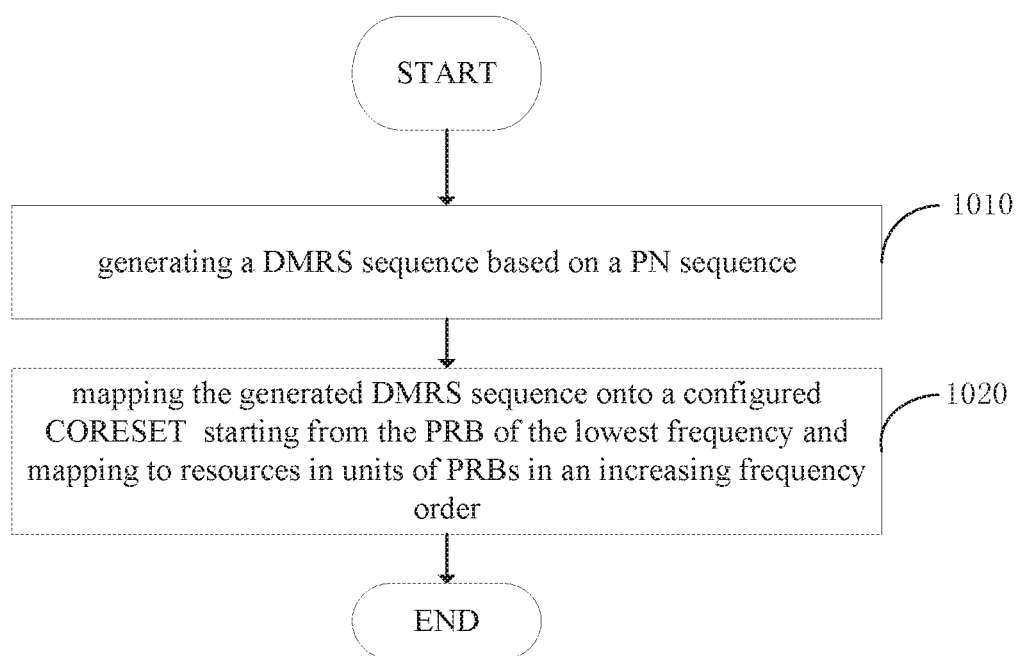
FIG. 10 illustrates a flow chart of a method for Demodulation Reference Signal (DMRS) generation for NR PDCCH in accordance with some embodiments of the disclosure.

FIG. 10 illustrates a flow chart of a method for Demodulation Reference Signal (DMRS) generation for NR PDCCH in accordance with some embodiments of the disclosure. The method may be applied to or performed by a gNB. At 1010, the gNB may generate a DMRS sequence based on a Pseudo-Noise (PN) sequence. At 1020, the gNB may map the generated DMRS sequence onto a configured control resource set (CORESET) on a PRB basis.

In some embodiments, a long sequence (i.e., DMRS sequence) based on a PN sequence may be generated in accordance with at least the maximum number of PRBs supported for a given subcarrier spacing in the configured CORESET, for example, the length of the generated DMRS sequence may be determined based on the maximum number of PRBs. In an embodiment, the generation of the DMRS sequence may be further based on the number of symbols for the configured CORESET, for example, the length of the generated DMRS sequence may be determined based on the maximum number of PRBs supported for a given subcarrier spacing and the number of OFDM symbols of the configured CORESET.

In some embodiments, the maximum number of PRB supported for given subcarrier spacing may be derived by the number of common PRBs within the system for the given subcarrier spacing. In an embodiment, common PRB indexing based on system bandwidth may be used for the generation of the DMRS sequence within the configured CORESET. This option is more appropriate for common CORESET, which can be used for the scheduling of common control message and/or UE-specific downlink control information (DCI). Note that this option may also be used for the UE-specific CORESET.

In the configured CORESET, each PRB/resource element group (REG) or each CCE may be associated with a determined part of the generated DMRS sequence based on at least its common PRB index of a PDCCH monitoring candidate. With this approach, the DMRS sequence can be known by the MU-MIMO UEs even when the allocated resource for PDCCH are partially overlapped.

In some embodiments, a long sequence (i.e., DMRS sequence) based on a PN sequence may be generated in accordance with at least the Bandwidth Part (BWP) that contains the configured CORESET, for example, the length of the generated DMRS sequence may be determined based on the number of PRB within the BWP that contains the configured CORESET. In an embodiment, the generation of the DMRS sequence may be further based on the number of symbols for the configured CORESET, for example, the length of the generated DMRS sequence may be determined based on the number of PRBs within the BWP that contains the configured CORESET and the number of OFDM symbols of the configured CORESET. In an embodiment, UE-specific PRB indexing may be used for the generation of DMRS sequence within the configured CORESET. Note that this option can be used for the UE-specific CORESET.

In some embodiments, the generated DMRS sequence may be mapped into the configured CORESET on one of;
  (i) Resource Element (RE)-level, i.e., each part in the sequence corresponds to a DMRS RE;
  (ii) Resource Element Group (REG)-level, i.e., each part in the sequence corresponds to all DMRS REs with a REG;
  (iii) REG Bundle (REGB)-level, i.e., each part in the sequence corresponds to all DMRS REs with a REGB;
  (iv) REGB-level, but limited to only the span of the REGB in frequency domain; or
  (v) REGB-level, but limited to only the span of the REGB in time domain, wherein options (iii) and (iv) and options (ii) and (v) converge for single-symbol CORESETs.

In an embodiment, for options (i), (ii) and (iv) with multi-symbol CORESETs, the PN sequence initialization can be defined as a function of the symbol index to which the sequence is applied instead of the starting symbol of the CORESET.

Note that REGBs are defined in both frequency-time dimensions for multi-symbol CORESETs.

In an embodiment, assuming a total number of 'P' PRBs, either based on common or UE-specific PRB indexing, within the maximum Component Carrier Bandwidth (CC BW) for a given subcarrier spacing (for common PRB) or within the BWP that contains the CORESET (for UE-specific PRB).

For the mapping option (i), the length of the PN sequence is given by P*d, where 'd' is the number of DMRS REs within a REG, e.g., d=3 for DMRS density ¼. In an example, the length of the PN sequence should be $P*d*n_{sym}$ if a single PN sequence is generated for mapping in both frequency and time dimensions, where $n_{sym}$ is the number of symbols for the CORESET.

For mapping option (ii), the length of the PN sequence is P. In an example, the length of the PN sequence should be P*nsym if a single PN sequence is generated for mapping in both frequency and time dimensions.

For the mapping option (iii), the length of the overall PN sequence is given by $(P*n_{sym})$ (REGBsize$_{freq}$*REGBsize$_{time}$), where $n_{sym}$ is number of symbols for the CORESET, REGBsize$_{freq}$ and REGBsize$_{time}$ are the REGB size in frequency and time dimensions. For single-symbol CORESETs, REGBsize$_{time}$=1 and for multi-symbol CORESETs, REGBsize$_{time}$=$n_{sym}$, implying that the length of the PN sequence equals P/REGBsize$_{freq}$.

For mapping option (iv), the length of the overall PN sequence is given by P/REGBsize$_{freq}$. In an example, the length of the PN sequence should be $P*n_{sym}$/REGBsize$_{freq}$ if a single PN sequence is generated for mapping in both frequency and time dimensions.

For mapping option (v), the length of the overall PN sequence is given by $P*n_{sym}$/REGBsize$_{time}$.

For DMRS sequence generation, given that both symbol-level and slot-level CORESET are supported for NR PDCCH, the initialization seed of the DMRS sequence for NR PDCCH can be defined as a function of one or more following parameters: symbol index, slot index, mini-slot index, starting symbol index of the configured CORESET, and CORESET-specific parameter configured by higher layers. Note that prior to radio resource control (RRC) signaling, the CORESET-specific parameter can be pre-defined for each relevant CORESET (e.g., CORESET for monitoring for DCI scheduling RMSI, for monitoring for DCI scheduling paging messages, for monitoring for DCI related to random access). Alternatively, it could be set to or defined as a deterministic function of the physical cell ID.

In an embodiment, to support implicit MU-MIMO transmission of PDCCH channel, the index/identify of antenna port (AP ID) may be additionally used as one initialization parameter to generate the DMRS sequence.

In one example, the PN sequence generator for DM-RS sequence of NR PDCCH can be initialized as:

$$c_{init}=(14\cdot(n_s+1)+l+1)\cdot(2\cdot n_{ID,m}^{PDCCH}+1)\cdot c_0+c_1 \quad (3)$$

where $c_0$ and $c_1$ are constants, which can be predefined in the specification, e.g., $c_0=2^{16}$ and $c_1=1$, $n_s$ is the slot index, l is the symbol index or starting symbol index of the configured CORESET, $n_{ID,m}^{PDCCH}$ is the parameter for $m^{th}$ CORESET, which is configured by higher layers. $n_{ID,m}^{PDCCH}$=$n_{ID,m}^{PDCCH}$=f($n_{ID}^{cell}$, m), where the function f( ) may be predefined in the specifications if no value is configured for $n_{ID,m}^{PDCCH}$ by higher layers.

In some embodiments, the gNB may determine the DMRS sequence based on a cell ID and a beam ID of a serving cell, or the DMRS sequence may be configured by higher layers with a first index and a second index. The gNB may generate a pseudo-random sequence based on the first index and may generate a scrambling sequence based on a second index. The gNB may generate a DMRS sequence based on the pseudo-random sequence and the scrambling sequence, e.g., by multiplying the pseudo-random sequence symbol by symbol with the scrambling sequence.

In some embodiments, the DMRS sequence may be generated on a PRB basis to facilitate MU-MIMO operation. The generated DMRS sequence is independent of PRB whether it is transmitted. In an embodiment, the generated DMRS sequence may be mapped into the configured CORESET starting from the PRB of the lowest frequency and mapping to resource in units of PRBs in an increasing frequency order.

Figure 11:
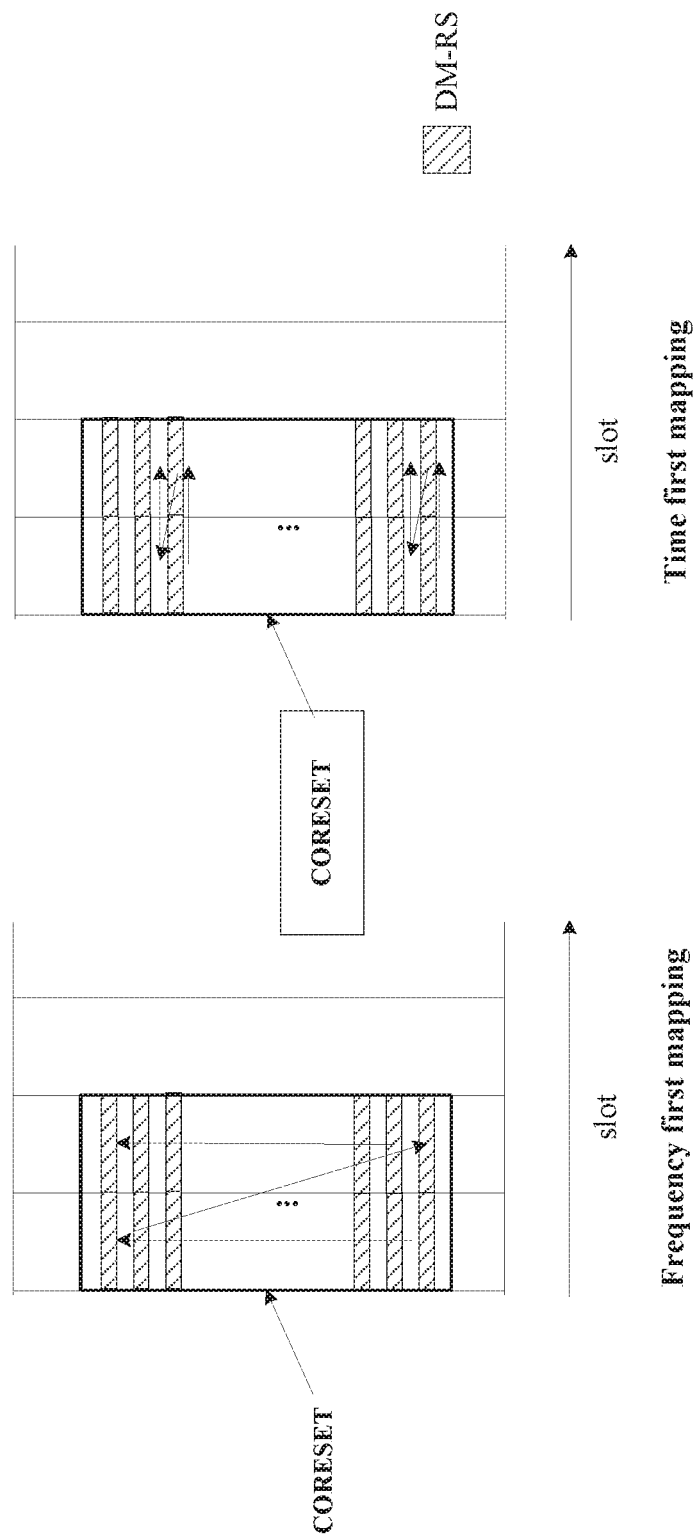
FIG. 11 illustrates an example of frequency first mapping and time first mapping for DMRS mapping when CORESET spans two symbols within one slot.

In some embodiments, the DMRS sequence may be mapped to the configured CORESET in a time first mapping or a frequency first mapping manner. In an embodiment, when the CORESET spans one symbol, the frequency first mapping manner is employed to map the DMRS sequence into the configured CORESET. In another embodiment, when the CORESET spans multiple symbols, the time first mapping or frequency first mapping manner is employed to map the DMRS sequence in the configured CORESET. FIG. 11 illustrates an example of frequency first mapping and time first mapping for DMRS mapping when CORESET spans two symbols within one slot.

In another embodiment, when the CORESET spans multiple symbols, the time first mapping or frequency first mapping manner is employed on a PRB basis to map the DMRS sequence into the configured CORESET. An orthogonal cover code (OCC) can be applied to the DMRS REs within a REG or REGB or a CCE or either time or frequency dimension only within a REGB for support of orthogonal MU-MIMO. In this case, a REG-level (i.e., PRB-level) or REGB-level or REGB-in-frequency-only or REGB-in-time-only-level mapping with the same sequence value for all REs within an REG, REGB, or REGB-in-frequency-only, or REGB-in-time-only can be more appropriate.

Figure 12:
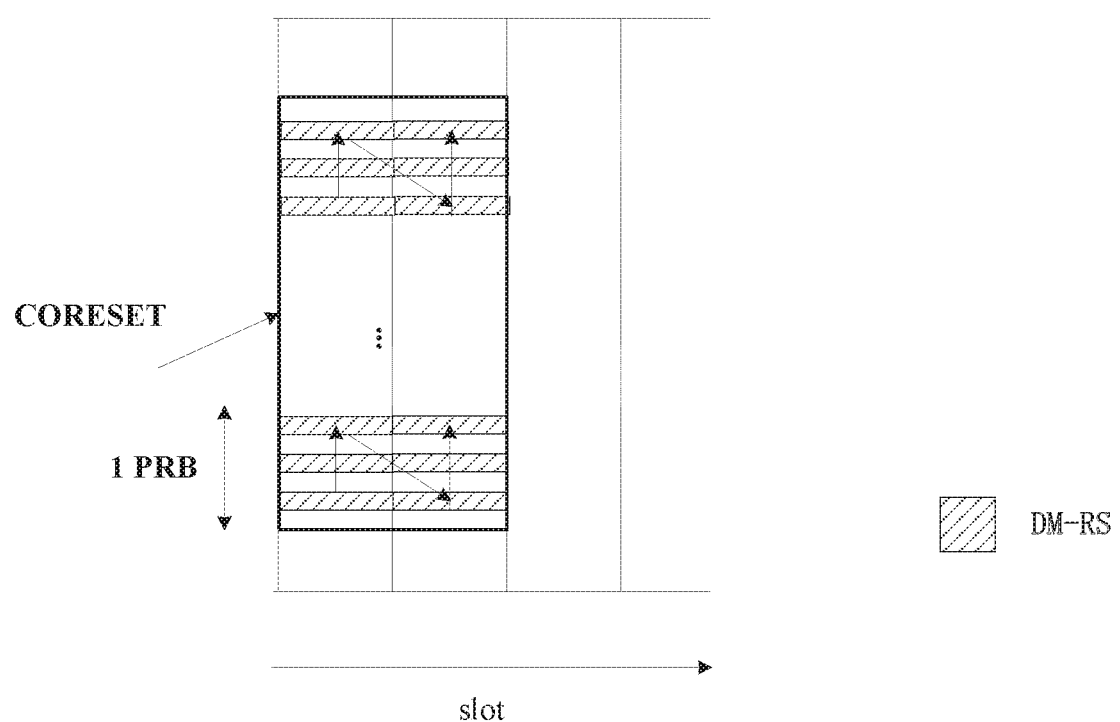
FIG. 12 illustrates an example of frequency first mapping on a PRB basis when CORESET spans multiple symbols.

FIG. 12 illustrates an example of frequency first mapping on a PRB basis when CORESET spans multiple symbols. In particular, DMRS is mapped in a frequency first and time second manner within a PRB. Then, it is mapped to subsequent PRBs within the configured CORESET.

A gNB connected to network may send multiple synchronization signal (SS) blocks in groups periodically to enable UEs to perform radio resource management measurements and initial cell acquisition. It should be noted that UE may not be able to receive all the SS blocks that are being sent by the gNB. This may be due to changes in the channel, beamforming directions, noise, etc. Therefore, it is important that UE is able to understand which SS block in the group it has detected, even if the UE has only detected a single SS block. Given that there are multiple SS blocks that are being sent in different time locations with respect to radio frame boundary, there must be some mechanism that allows indication of which SS block it is within the SS block set periodicity. The indication of the SS block position is denoted as SS block time index signaling.

The SS block is composed of primary synchronization signal (PSS), secondary synchronization signal (SSS), and physical broadcast channel (PBCH). Since PSS and SSS contains the cell identification, it will be difficult to embed the SS block time index signaling into the PSS/SSS. The time index signaling can be sent along with PBCH. For neighbor cell measurements, other than the time index signaling, no other information is needed from PBCH. Because detection and decoding of the time index signaling will be typically same as the rest of the payload in the PBCH, PBCH design may need to be over-dimensioned such that it can have very reliable reception of the SS block time index. Therefore, there is a need to provide early decoding of the SS block time index of the PBCH payload.

The present disclosure provides a method for early decoding of a part of an information payload when polar code is used for encoding the information payload. The part of the information payload could be the time index or a partial SS block index, and the information payload could be the entire PBCH payload.

The present disclosure utilizes the property of polar decoders such as successive cancellation decoder or successive cancellation list decoder, which outputs estimates of data bits in a sequential fashion. By placing bits for the partial SS block index in the locations that are decoded in the decoding order, the gNB can ensure that the UE side can start decoding in the decoding order, and stop decoding once the bits for the partial SS block index are decoded. The polar decoder can stop or skip decoding of the rest of the PBCH payload.

Figure 13:
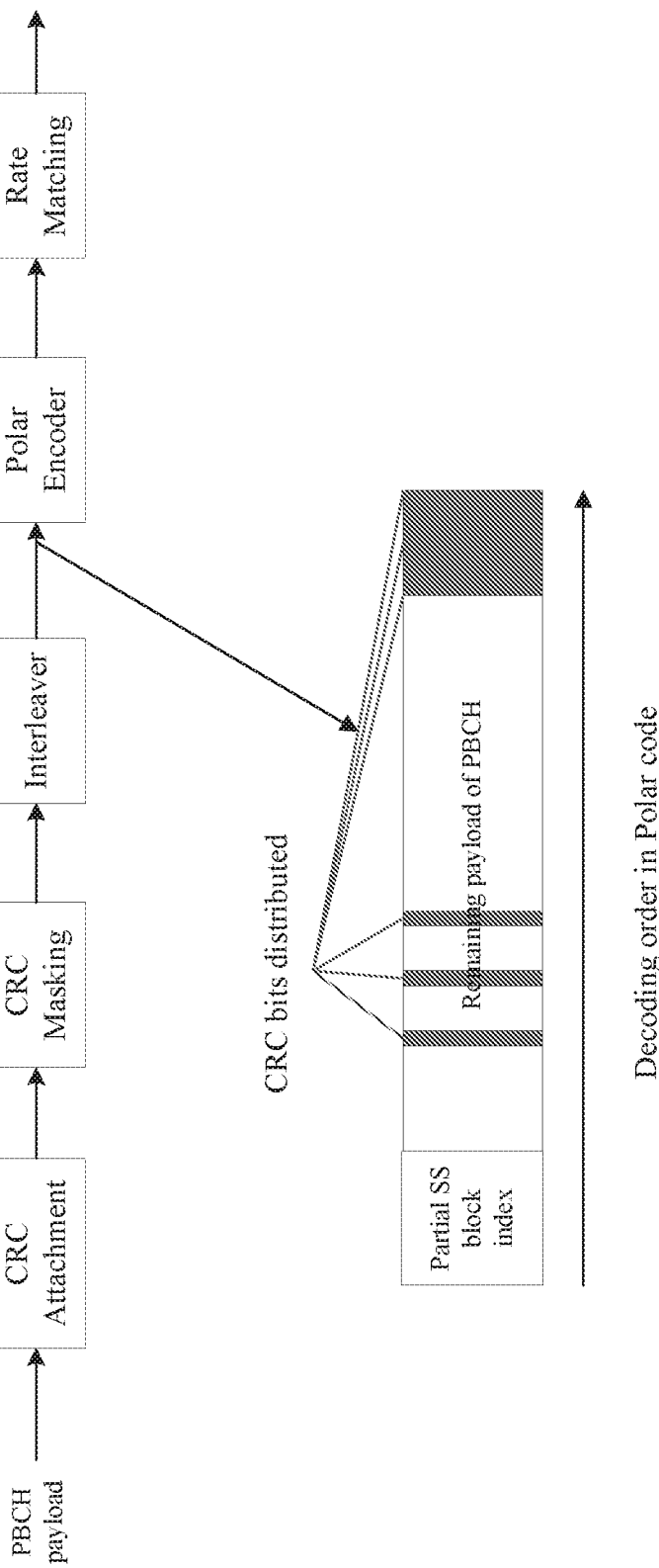
FIG. 13 illustrates an exemplary processing chain for NR PBCH in a gNB in accordance with some embodiments of the disclosure.

FIG. 13 illustrates an exemplary processing chain for NR PBCH in accordance with some embodiments of the disclosure. The processing chain may be applied to or performed by a gNB. As shown in FIG. 13, an interleaver is applied after CRC attachment and prior to Polar encoding to allow early termination at UE side. Note that possible scrambling of partial PBCH payload before CRC attachment is not shown for brevity. The interleaver can be used to distribute the PBCH payload and CRC, and after the interleaver, the mapping to the polar encoder enables the partial SS block index to appear first (or early) in the polar decoding order, as shown in FIG. 13, which also illustrates an example of how a partial SS block index, remaining payload of PBCH and any attached CRC can be mapped to the Polar code input. Next, the PBCH payload is polar encoded (e.g. frozen bit insertion, etc. may be included), followed by other operations including rate-matching, possible channel interleaving, and modulation mapping.

In some embodiments of the disclosure, There may be some additional operations such as scrambling, etc., which are generally not shown for brevity but these can also be applied without losing benefit of the disclosure.

Figure 14:
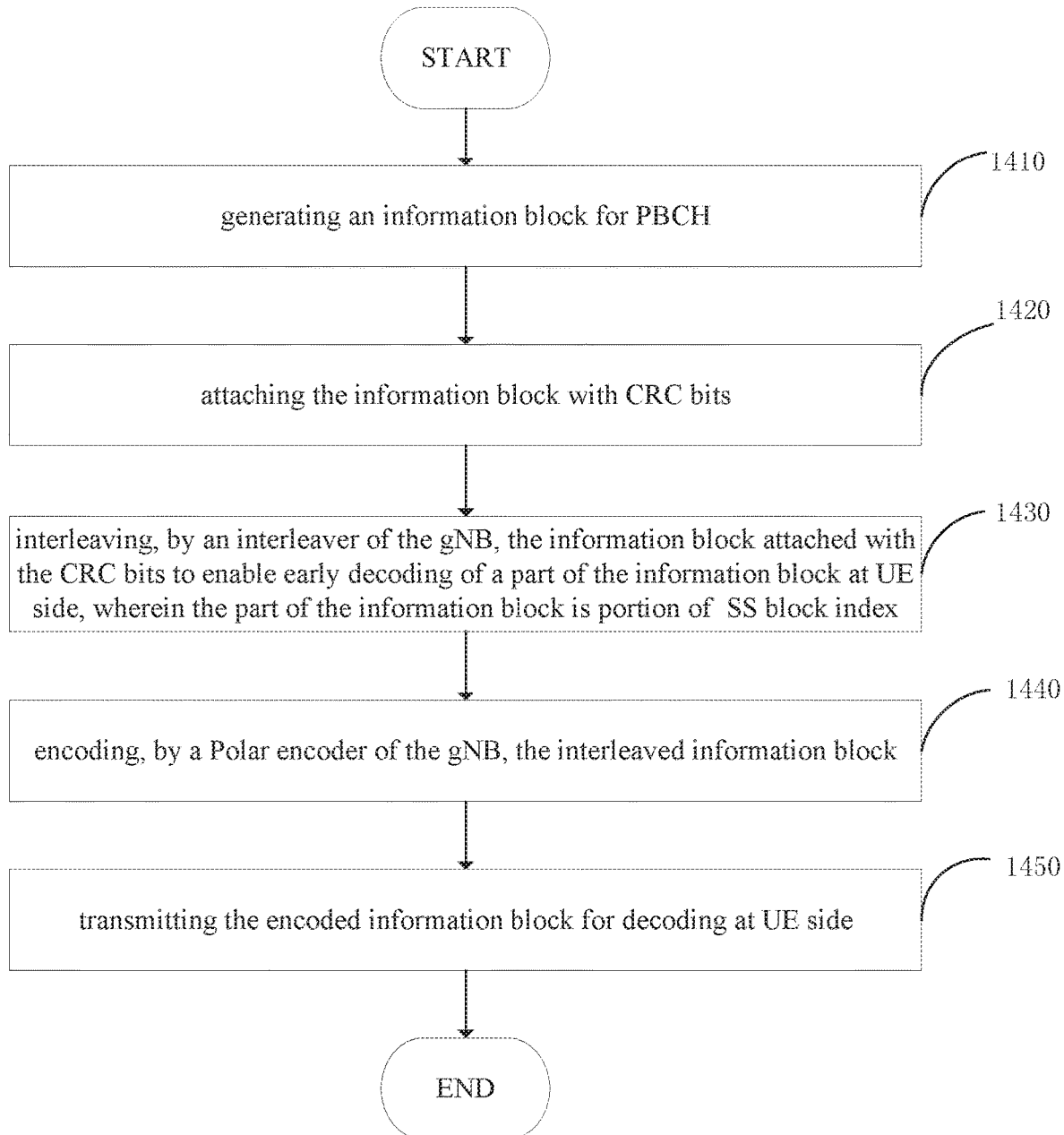
FIG. 14 illustrates a flow chart of a method for PBCH encoding in accordance with some embodiments of the disclosure.

FIG. 14 illustrates a flow chart of a method for encoding NR PBCH in accordance with some embodiments of the disclosure. The method may be applied to or performed by a gNB. At 1410, the gNB may generate an information block for PBCH. At 1420, the gNB may attach the information block with CRC bits. At 1430, the interleaver of the gNB may interleave the information block attached with the CRC bits to enable early decoding of a part of the information block at User Equipment (UE) side, wherein the part of the information block may be the SS block index in the PBCH, e.g., a SS block time index. At 1440, the polar encoder of the gNB encode the interleaved information block; and At 1450, the gNB may transmit the encoded information block for decoding at UE side.

Figure 15:
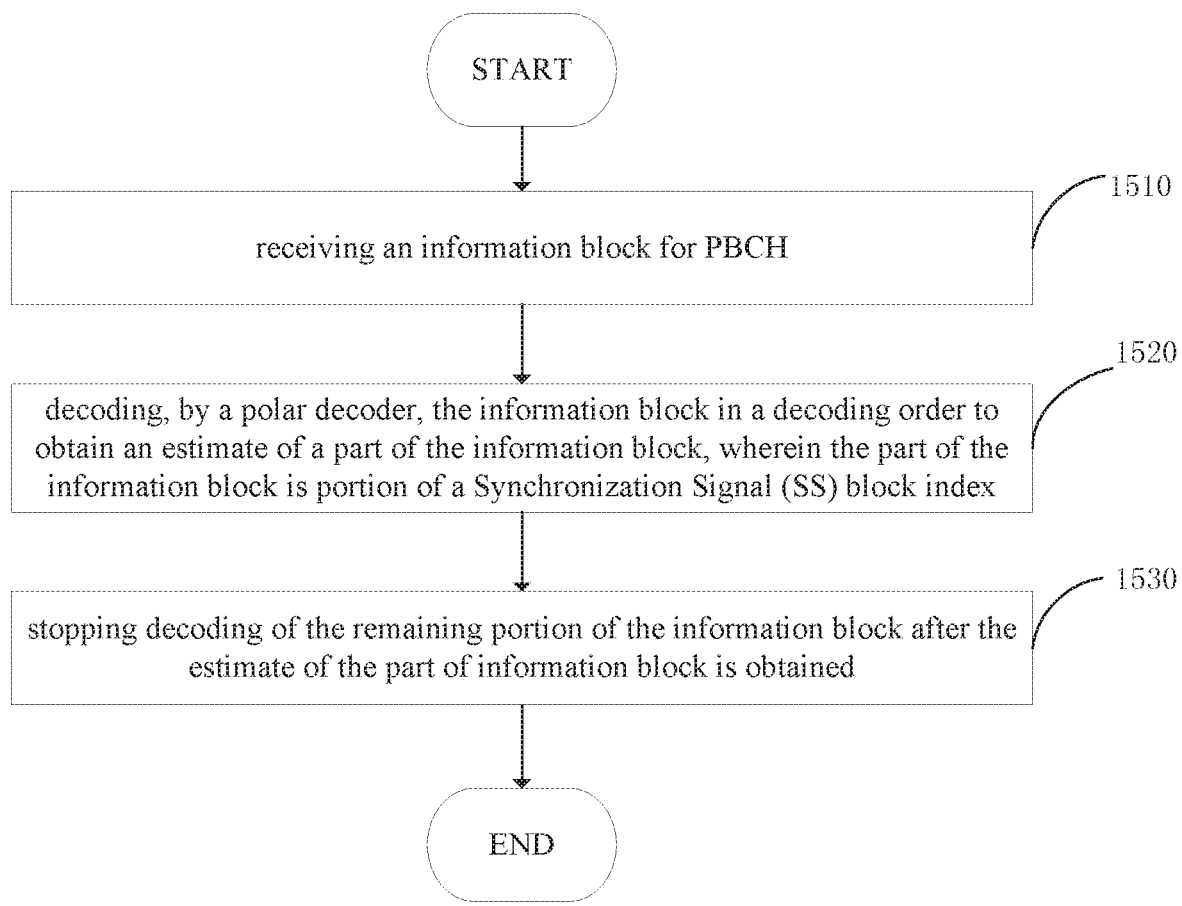
FIG. 15 illustrates of a flow chart of a method for PBCH decoding in accordance with some embodiments of the disclosure.

FIG. 15 illustrates of a flow chart of a method for decoding NR PBCH in accordance with some embodiments of the disclosure. The method may be applied to or performed by a UE. At 1510, the UE may receive an information block for PBCH from a gNB. At 1520, a polar decoder of the UE may decode the information block in a decoding order to obtain an estimate of a part of the information block, wherein the part of the information block may be the SS block index in the PBCH, e.g., a SS block time index, the polar decoder may stop decoding of the remaining portion of the information block after the estimate of the part of information block is obtained at 1530.

Figure 16A:
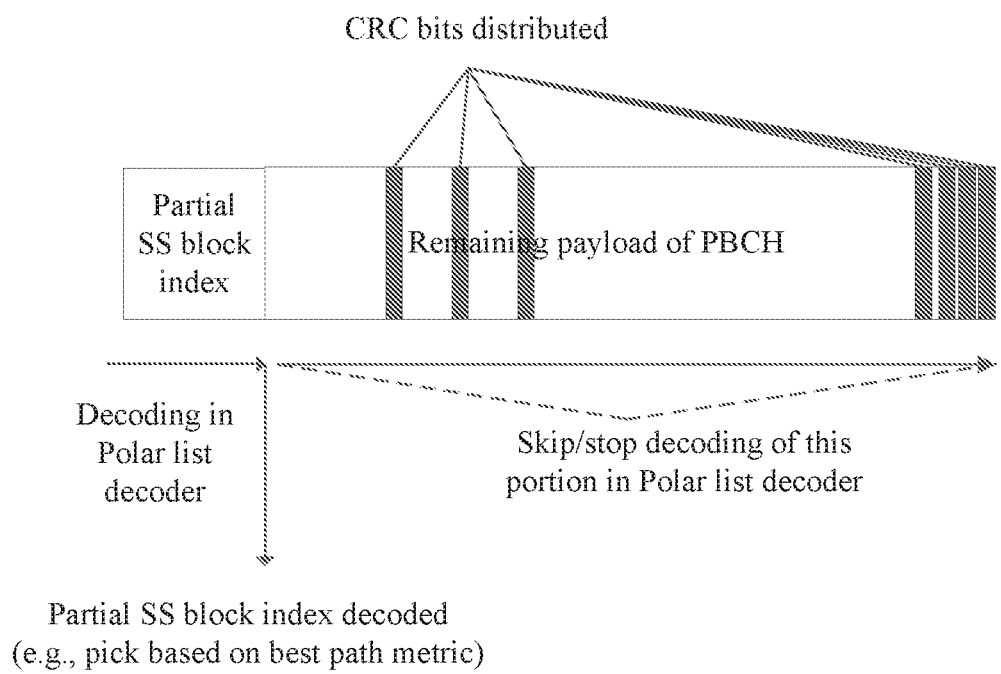
FIG. 16a illustrates an example of PBCH decoding in accordance with some embodiments of the disclosure.

In some embodiments, as shown in FIG. 16a which illustrates an example of PBCH decoding, the polar list decoder e.g., a SCL decoder at UE side may decode the information block for PBCH until the bit estimates corresponding to the bits for the partial SS block index are available, which may correspond to one or more paths in case of list decoding, the polar decoder may provide an estimate of partial SS block index by choosing one of many choices, e.g. a path out of L paths (e.g. in case of list L decoding) that has the best path metric (e.g. path metric with least penalty). In certain cases, if the polar decoder is unable to select the best path, the decoder may proceed a bit further to decode a few more bits in the decoding order until it is confident that one path case be reliably selected. Once the path is selected, the decoder can skip or stop decoding of the remaining portion of the payload.

In some embodiments, the bits corresponding to the part of the information block (e.g., bits for the partial SS block index) may be disposed at relatively early positions in the interleaved information block. In an example, the bits for a partial SS block index may be disposed at relatively early positions in the interleaved block for PBCH.

In some embodiments, the bits corresponding to the part of the information block (e.g., bits for the partial SS block index) may be disposed at positions in polar encoding which correspond to relatively early positions in the decoding order for Polar decoding.

Figure 16B:
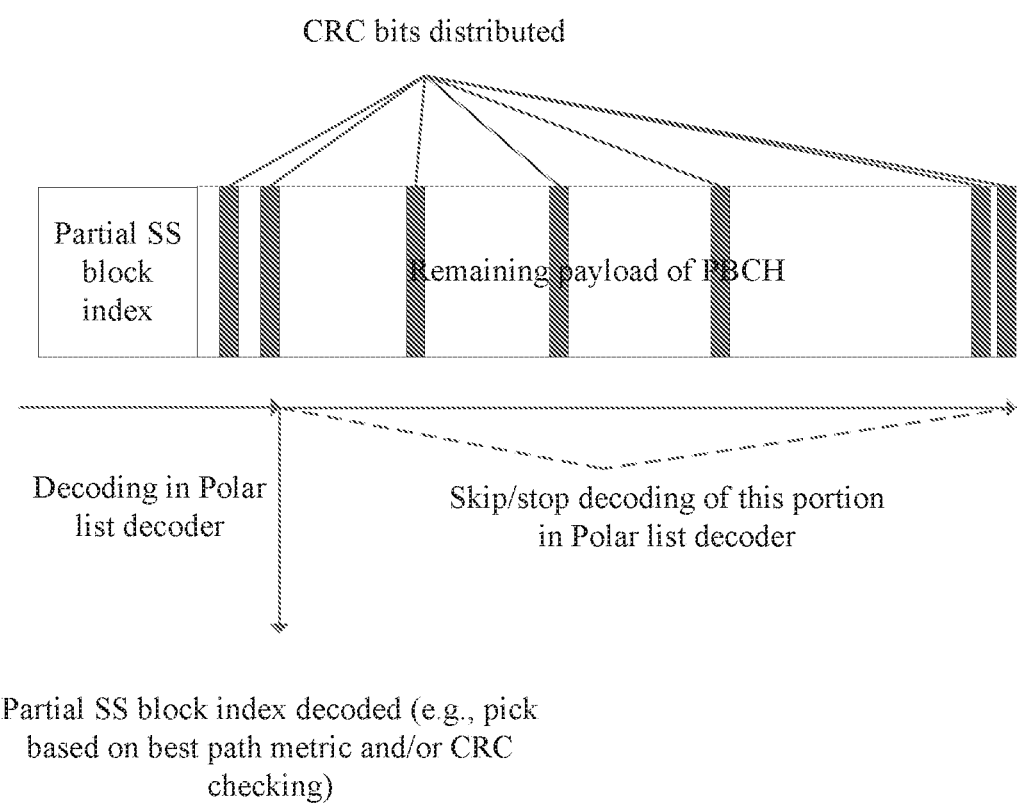
FIG. 16b illustrates another example of PBCH decoding in accordance with some embodiments of the disclosure.

In some embodiments, as shown in FIG. 16b which illustrates another example of PBCH decoding, the polar list decoder at UE side also has the assistance of CRC bits that are placed early—the decoder may decode the block for PBCH until the bit estimates corresponding to partial SS block index bits are available, which in case of list decoding may corresponding to one or more paths. The polar decoder may provide an estimate of the partial SS block index by choosing one of many choices, e.g. a path out of L paths (e.g., in case of list L decoding) that has the best path metric (e.g. path metric with least penalty) and/or using CRC check (i.e. a path that passes CRC). In an example, a path that has the best path metric may be selected from the paths. In another example, a path that passes CRC check is selected form the L paths. In yet another example, a path that has the best path metric and passes CRC check is selected from the L paths. In certain cases, if the decoder is unable to select the best path because the CRC is placed later, the decoder may proceed a bit further to decode a few more bits in the decoding order until it is confident that one path case be reliably selected. Once the path is selected, the decoder can skip or stop decoding of the remaining portion of the payload. Since there may be a 24-bit CRC attached, and PBCH may require less CRC bits for protection, a CRC interleaver may be designed differently than a DL control interleaver—the CRC interleaver for PBCH could offer additional CRC bits early in decoding order to assist with the partial SS block index.

In some embodiments, the bits corresponding to a part of the information block and at least a part of CRC which assists with the part of the information block may be disposed at relatively early positions in the interleaved information block. In an example, bits for a partial SS block index and a part of CRC bits which assists with the partial SS block index may be disposed at relatively early positions in the interleaved block for PBCH.

In some embodiments, the bits corresponding to a part of the information block and at least a part of the CRC bits which assists with a part of the information block may be disposed at positions in Polar encoding which correspond to relatively early positions in the decoding order for Polar decoding. In an example, bits for a partial SS block index and a part of CRC bits which assists with the partial SS block index may be disposed at positions in Polar encoding which correspond to relatively early positions in the decoding order for Polar decoding.

In some embodiments, in order to obtain the estimate of the part of the information block, e.g., the partial SS block index, the UE may obtain a set of log-likelihood ratios (LLRs) corresponding to the information block; partially decode the received LLRs to obtain one or more candidate decoding paths corresponding to the part of the information block; select a candidate decoding path from the one or more candidate decoding paths based on a selection criteria; and output the estimate of the part of the information block based on the selected decoding path. In an example, the selection criteria may be based on polar decoder path metric. In another example, the selection criteria may be based on polar decoder path metric and CRC checking. For example, the CRC checking may be based on partial CRC check bit estimates that are also obtained based on the partial decoding.

Next the properties of Polar codes will be described.

Polar codes have two main properties. The first property is the linearity of the polar codes. Polar codes are linear, which means that two (or more) information fields that are added together prior to polar encoding is equivalent to two (or more) information field that are polar encoded separately and added together after encoding. Here the addition is a modulus 2 addition.

Figure 17:
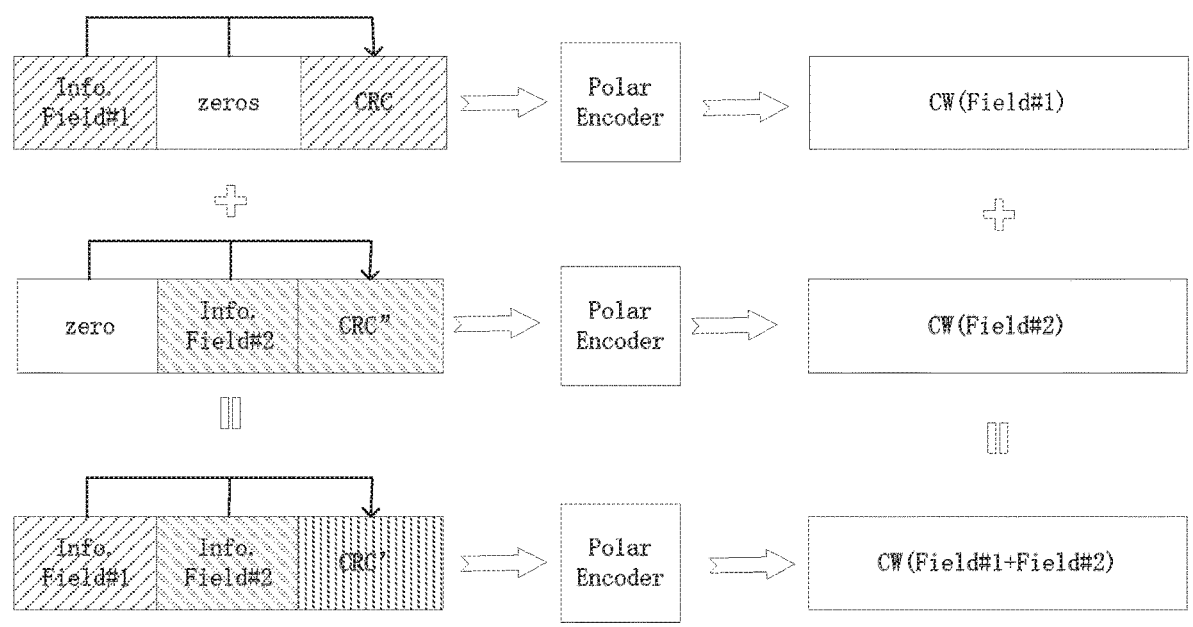
FIG. 17 illustrates an example of polar linearity when information payload consist of two information fields and a CRC field.

FIG. 17 illustrates an example of the polar linearity when information payload consist of two information fields (For example, one is for the partial SS block index, and one is for the remaining payload of PBCH) and cyclic redundancy check (CRC) field. The CRC is computed using the entirely of the information field (including zero). This is possible as CRC computation is also linear. CRC computed with both fields is equivalent to CRC computed with individually and added together later. Information payload that consists of field #1, field #2, and CRC. Payload #1 that consists of field #1, set of zeros (bitwidth equal to field #2), and CRC, is encoded with polar encoder into codeword #1. Payload #2 that consists of set of zeros (bitwidth equal to field #1), field #2, and CRC, is encoded with polar encoder into codeword #2. Payload #3, that consists of field #1, field #2, and CRC, is encoded with polar encoder into codeword #3. Payload #3 can be equivalently generated by modulos 2 addition of payload #1 and #2. Codeword #3 can be equivalently generated by modulos 2 addition of codeword #1 and #2.

The second property of polar codes is that there exist an ordering of reliability for each input bit of the polar encoder. The lower reliability bits are typically predetermined and called frozen bits. The receiver utilizes prior information of these so-called frozen bits to achieve better decoding performance.

Based on the two properties of polar codes, a system of transmission of two (or more) information fields is provided, where a combination of the information fields is encoded into two (or more) polar encoded codewords (CW), and two (or more) codewords are transmitted to the receiver. The first codeword is generated by encoding the information field #1, set of zeros that have same bitwidth as information field #2, and CRC with a polar encoder. The second codeword is generated by encoding the information field #1, information field #2, and CRC with a polar encoder. Both codewords are sent to the receiver.

Figure 18A:
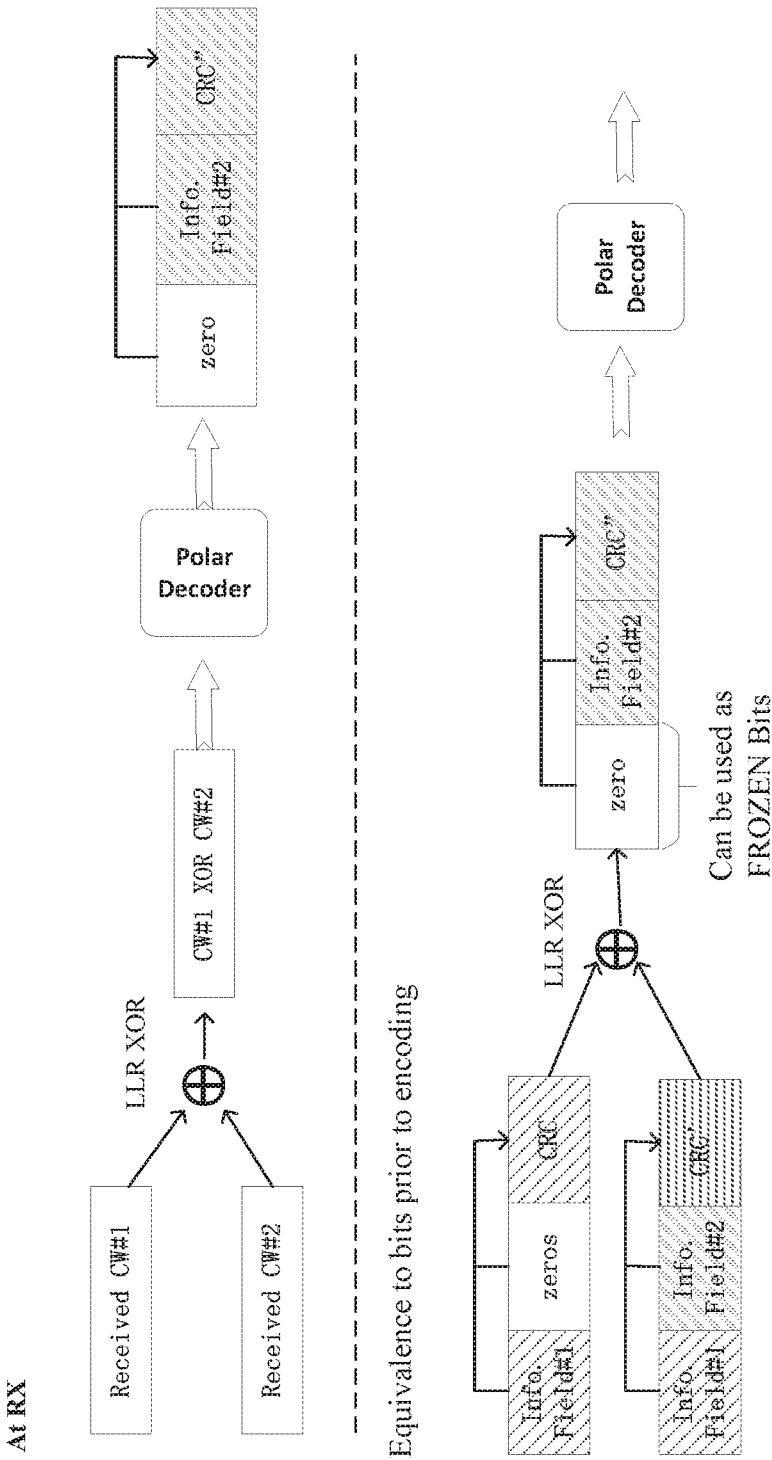
FIGS. 18a-c illustrate examples of receiver processing for information fields in accordance with some embodiments of the disclosure.

At the receiver, received codewords are soft-bit level XOR operated together and decoded with polar decoder. This will provide output of just information field #2 and CRC associated with field #2. FIG. 18a illustrates an exemplary receiver processing for information field #2. The soft-bit level XOR operation of the two codewords, one that contains both information fields and one that contain only information field #1, effectively generates a codeword with information field #2 with set of zeros that corresponding to the bitwidth of the information field #1. The set of zeros can be used an effective frozen bits during the decoding process as it know to the receiver that they are zero (i.e. predetermined information). This aids decoding performance of the information field #2 compared with information field #1.

Figure 18B:
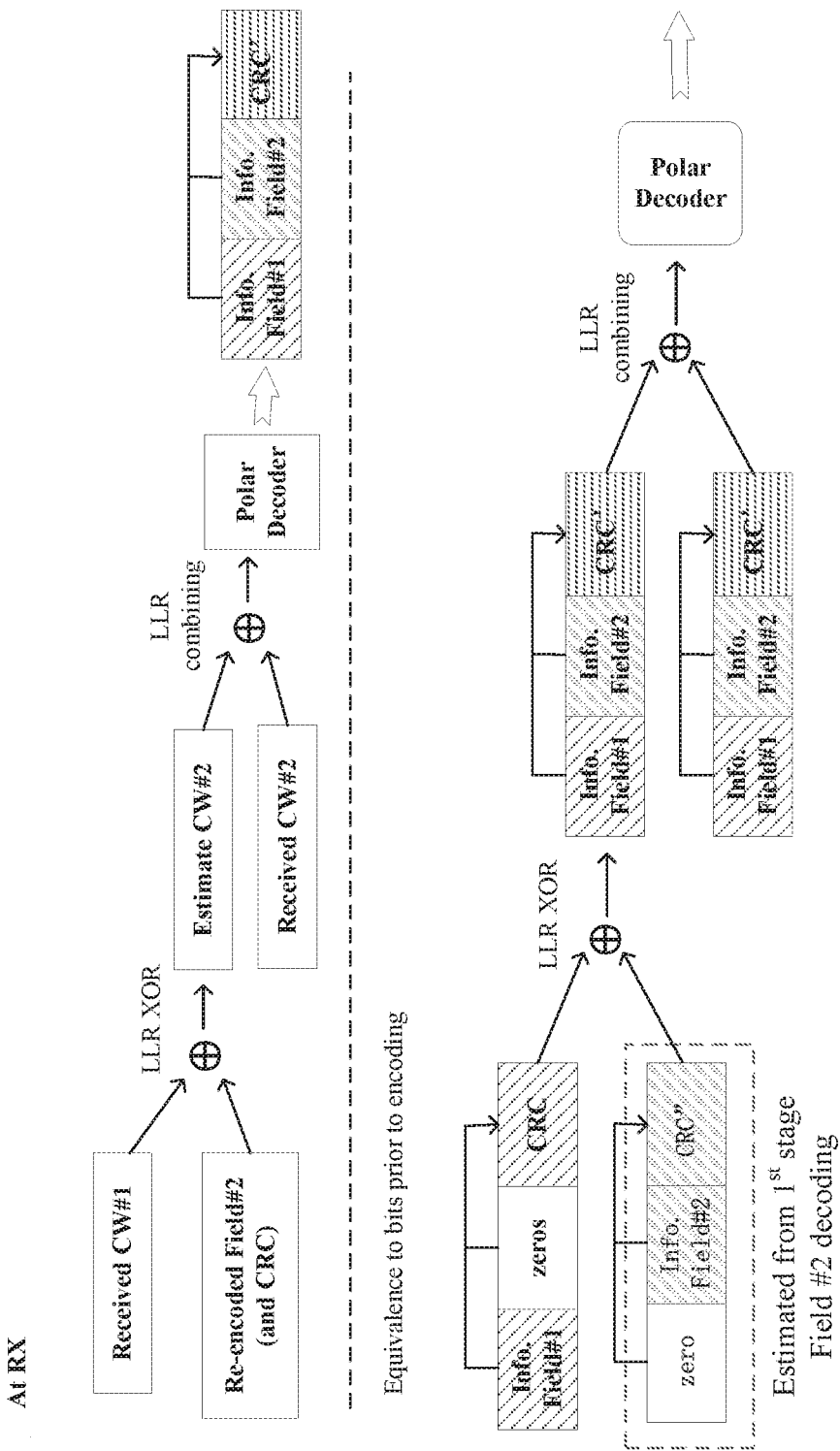
Figure 18C:
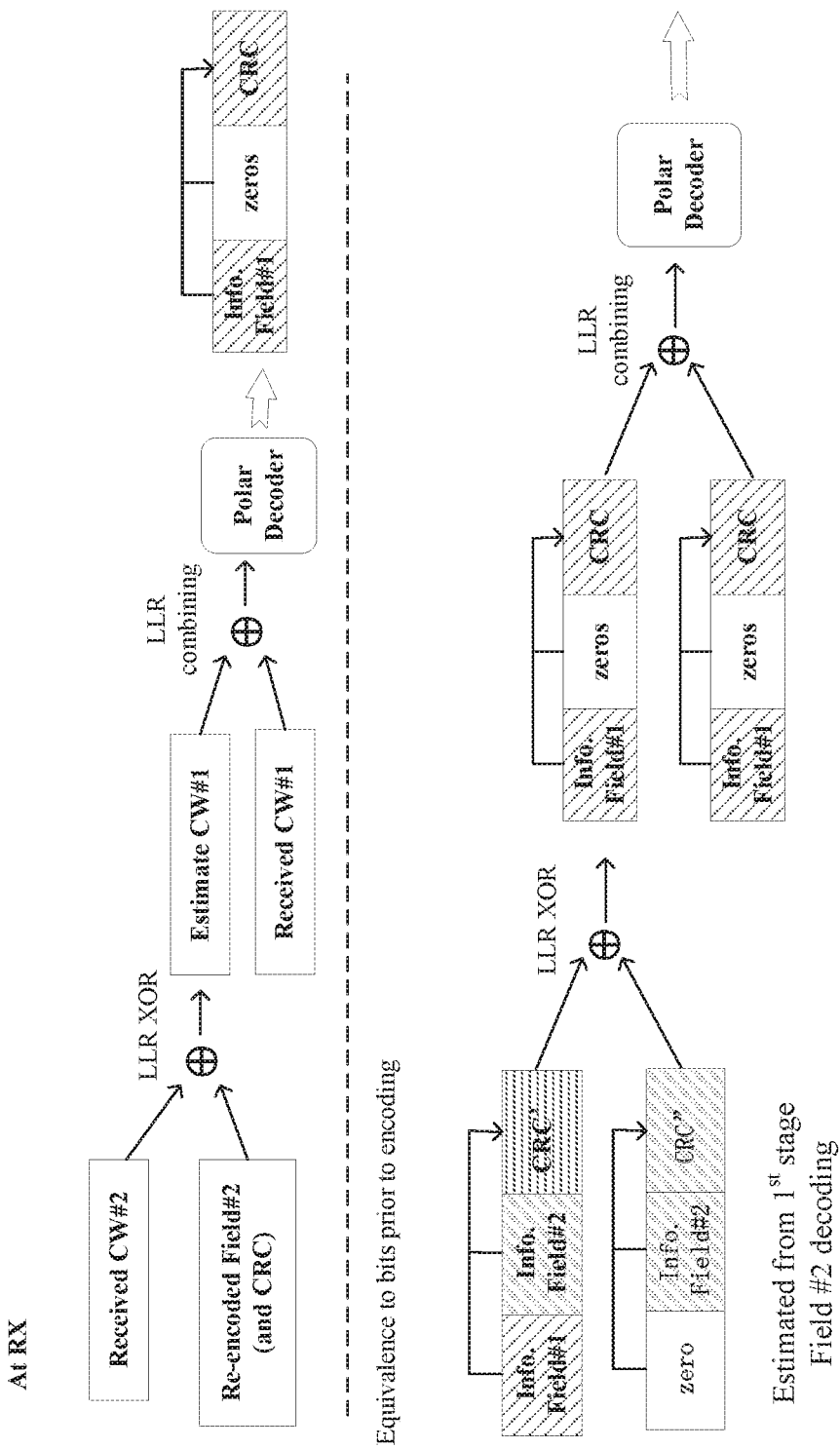

Information field #1 and #2 can be directly decoded from the codeword that contains both information fields. To achieve better decoding performance by soft-combining information in all received codewords, the correctly decoded information field #2 with CRC can be re-encoded into an ideal codeword and soft-bit wise XOR with one of the received codeword, for example codeword #1. This effectively creates a copy of the codeword #2, which can be directly soft-combined with received codeword #2 for polar decoding. The whole process can be done by soft-bit wise XOR with codeword #2, and soft-combining the resultant codeword with codeword #1. In the former example, the decoding provides both information field #1 and #2 as output, where in the latter example, the decoding provides information field #1 as output. Examples of the former and latter examples are shown in FIG. 18b and FIG. 18c, respectively.

The procedure for detection of information field #1 and #2 requires that decoding of more important information, information field #2, is very reliable. Any error in decoding of the information field #2 would result in error of information field #1. To provide better detection of the more important information, information field #2, we can order the information bits according to the bit reliability. Information field #2 and CRC can be positioned in the highest reliable bits of the polar encoder. This ensures that when information field #1 is zeroed out by the soft-bit XOR operation at the receiver, the zero bits can be utilized as frozen bits during the polar decoding process. This enabled better decoding performance of the information field #1.

Figure 19A:
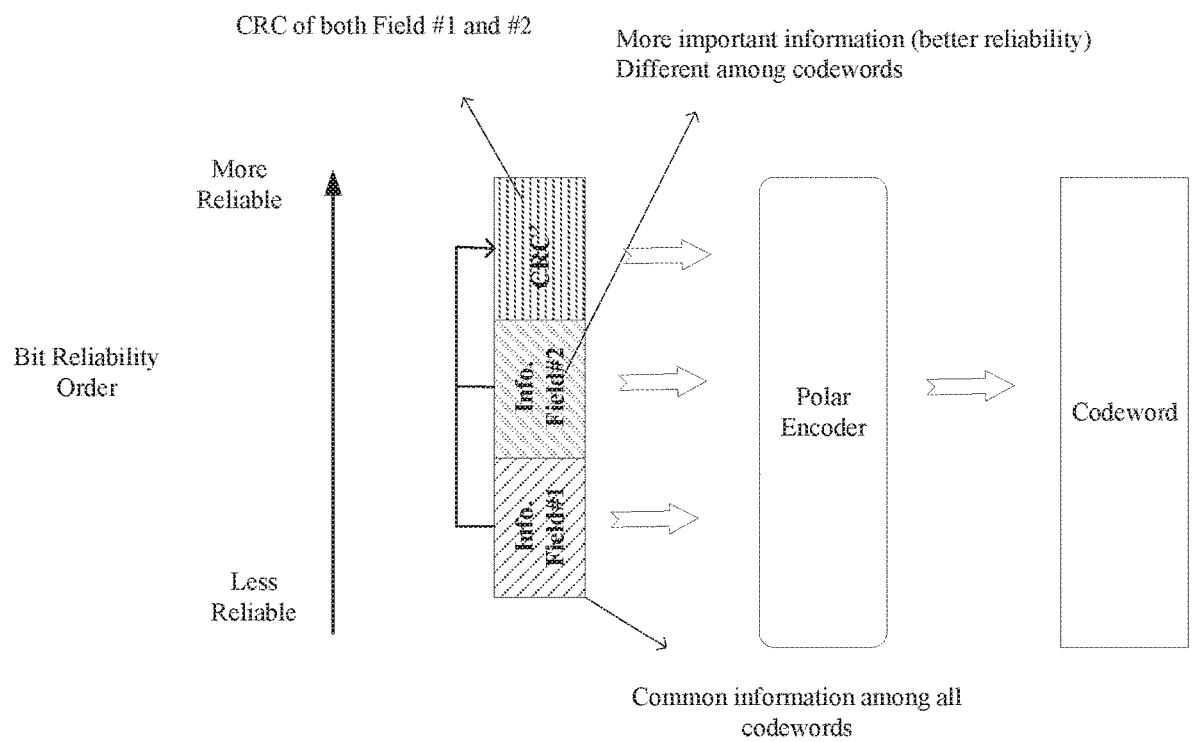
FIGS. 19a-b illustrate examples of bit reliability ordering of the information fields #1, #2, and CRC.
Figure 19B:
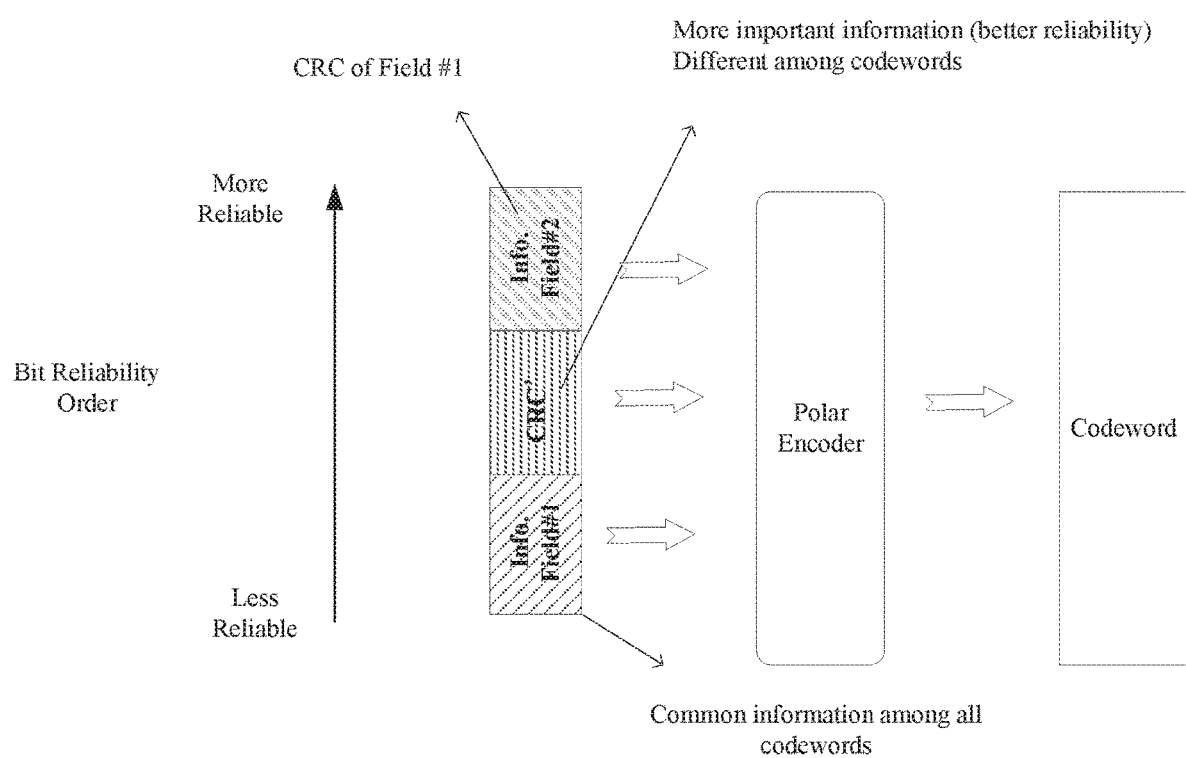

FIG. 19a and FIG. 19b illustrates examples of the bit reliability ordering of the information field #1, #2, and CRC. In FIG. 19a, information field #2 and CRC is positioned in the highest reliable bit positions, while information field #1 is positioned at the least reliable bit positions that are not explicit frozen bits. The CRC is computed with both information field #1 and #2. In FIG. 19b, information field #2 is positioned in the highest reliable bit position and no CRC is computed based on information field #2. Information field #1 and CRC is positioned the less reliable bit position. In both examples, the explicit frozen bits are always positioned in the least reliable bits position of the polar encoder. In the example of FIG. 19b, decoding of information field #2 will have more effective frozen bits, corresponding to information field #1 and CRC field, compared to the example in FIG. 19a. The drawback is the lack of CRC for information field #2, which may restrict the decoding algorithms available for polar codes, namely list decoding techniques that rely on CRC for sanity check.

Figure 21:
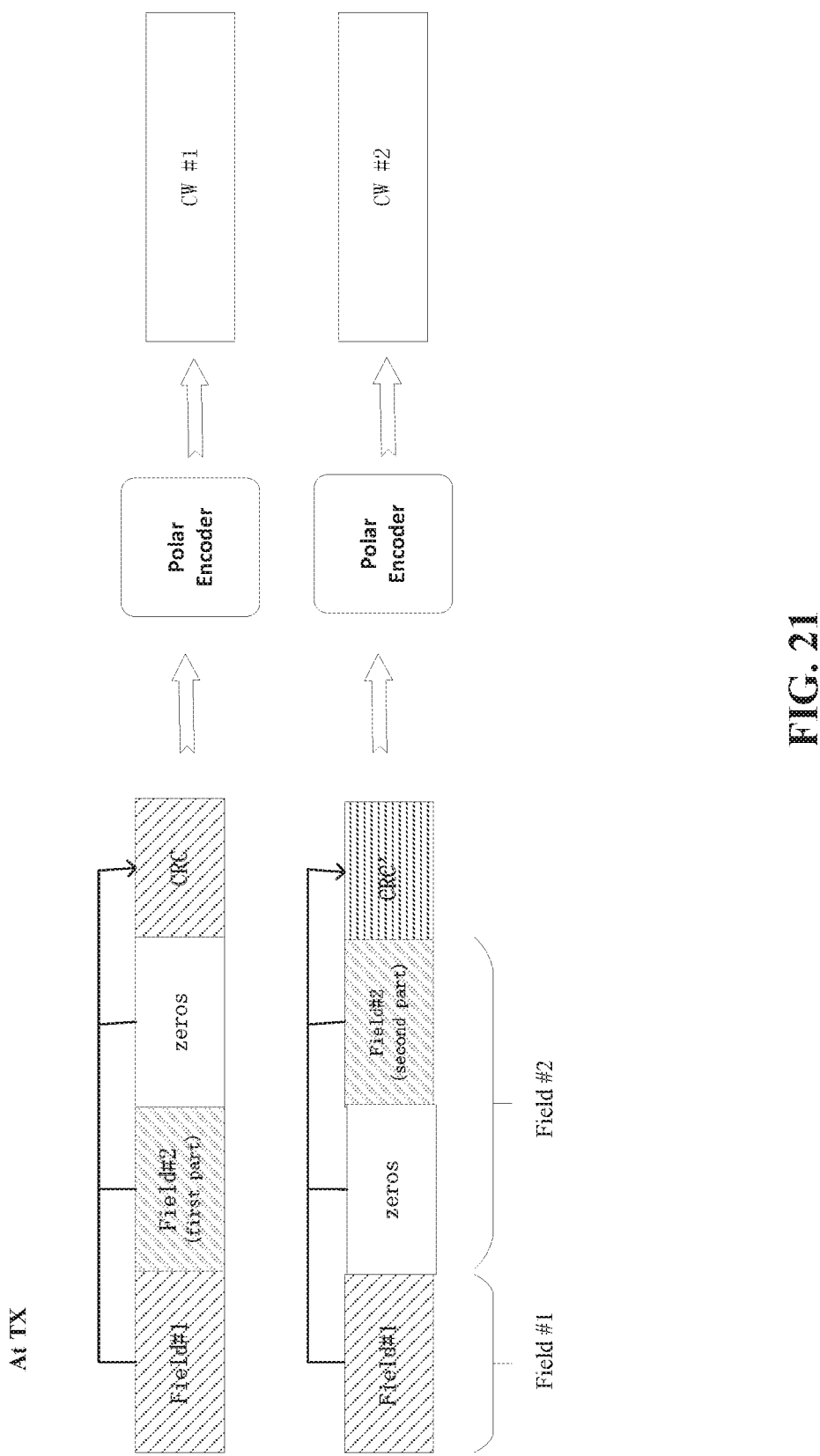
FIG. 21 illustrates the difference in value between the approximated XOR operation versus true XOR operation.

As another variant of the proposed system, the more important information field, information field #2, can be split into multiple codewords, where each codeword contains an exclusive bits of the information field #2. For example, the half of the information field #2 can be contained in the first codeword, and the rest of the information field #2 is contained in the second codeword. An example of this is shown in FIG. 21. In the payloads of the codewords, information field #2 is split among the payloads exclusively such that no information from information field #2 from multiple payloads overlap in bit positions. At the receiver, information field #2 can be obtained from decoding of the soft-bit XOR of the received codewords.

Soft-bit XOR can be computed from log likelyhood ratios (LLR) of the receive bits. The LLR is defined as the logarithm of the ratio of the probability of the receive bits being 0 and 1. Mathematically, it can be written as:

$$LLR(x) = \log\frac{P(x=0)}{P(x=1)}. \quad (4)$$

Soft-bit XOR (or LLR XOR) can be computed from LLRs of two soft-bits, $x_1$ and $x_2$, by the following equation:

$$LLR(x_1 \; xor \; x_2) = \frac{1 + e^{(LLR(x_1)+LLR(x_2))}}{e^{LLR(x_1)} + e^{LLR(x_2)}}. \quad (5)$$

Since the calculation involves exponential operations, it can be approximated using the following equation $$LLR(x_1 \; xor \; x_2) = \frac{1 + e^{(LLR(x_1)+LLR(x_2))}}{e^{LLR(x_1)} + e^{LLR(x_2)}} \approx \quad (6)$$

$$\text{sign}(LLR(x_1)) \cdot \text{sign}(LLR(x_2)) \cdot \min(|LLR(x_1)|, |LLR(x_2)|).$$

Figure 20:
FIG. 20 illustrates an example of information field split according to some embodiments of the disclosure.

The approximation of the XOR and true XOR operation are quite similar. FIG. 20 shows the difference in value between the approximated XOR operation versus true XOR operation.

In some embodiment of the disclosure, the PBCH payload in the SS block may comprise two codewords. One of the codewords contain all of the PBCH information, including the time index signaling, and the other codeword contain all the PBCH information excluding the time index signaling. Alternatively, the two codewords can contain exclusive bits of the time index signaling. The codewords can be mapped to one PBCH OFDM symbol each. At UE side, the UE can try to decode the time index signaling separately by performing soft-bit XOR of the received codewords and performing polar decoding.

It should be noted that it is actually possible to have multi-stage decoding and multiple information fields larger than 2 that all have different decoding reliability. For example, the information field #2, can be split further into information field #2a and #2b, as shown in FIG. 21. The same technique used to differentiate the reception reliability of information field #1 and #2 can be applied to sub-information field #2a and #2b.

Figure 22:
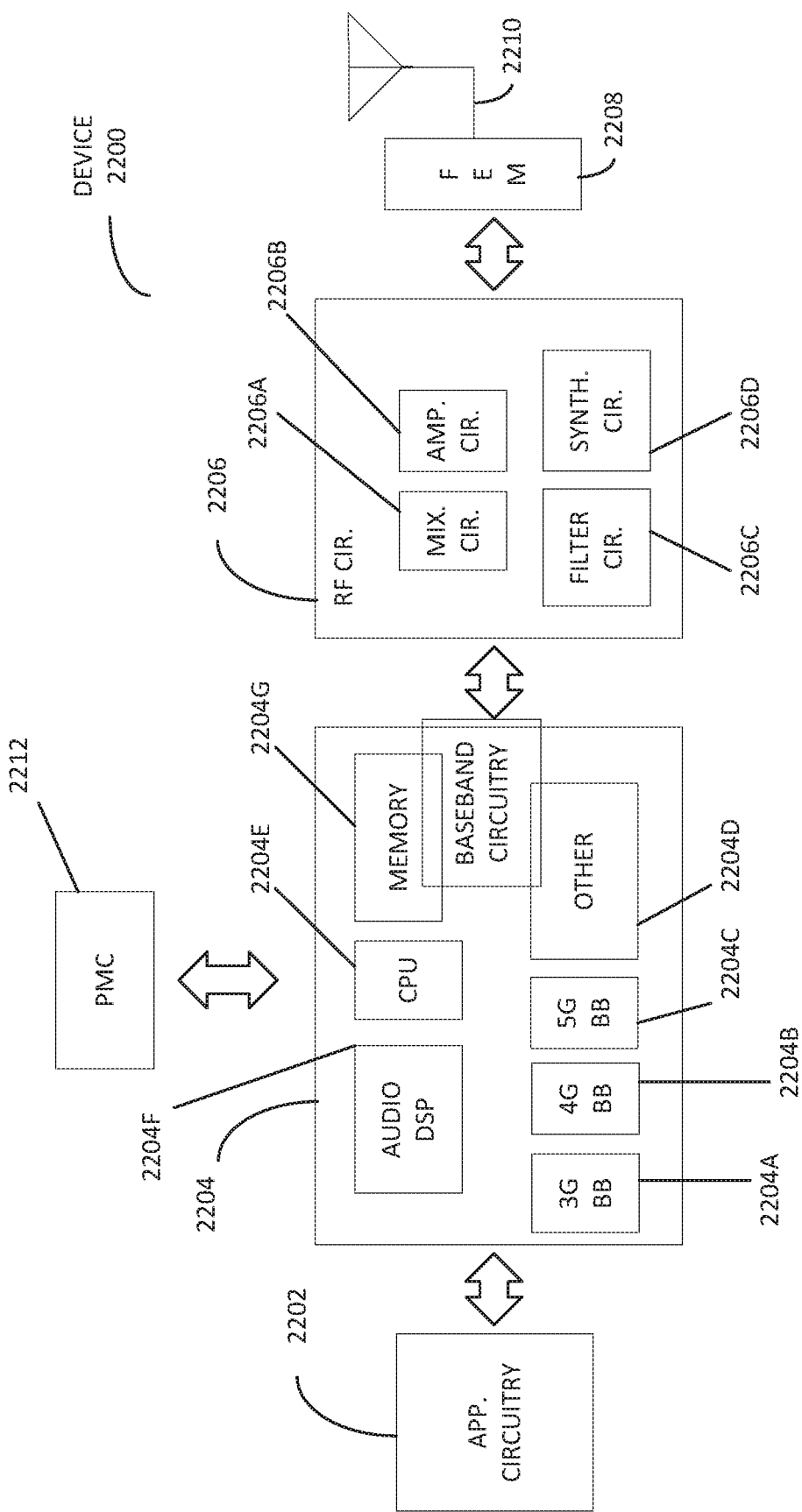
FIG. 22 illustrates example components of a device in accordance with some embodiments.

FIG. 22 illustrates example components of a device 2200 in accordance with some embodiments. In some embodiments, the device 2200 may include application circuitry 2202, baseband circuitry 2204, Radio Frequency (RF) circuitry 2206, front-end module (FEM) circuitry 2208, one or more antennas 2210, and power management circuitry (PMC) 2212 coupled together at least as shown. The components of the illustrated device 2200 may be included in a UE or a RAN node, e.g., gNB. In some embodiments, the device 2200 may include less elements (e.g., a RAN node may not utilize application circuitry 2202, and instead include a processor/controller to process IP data received from an EPC). In some embodiments, the device 2200 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 2202 may include one or more application processors. For example, the application circuitry 2202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 2200. In some embodiments, processors of application circuitry 2202 may process IP data packets received from an EPC.

The baseband circuitry 2204 may include circuitry such as, but not limited to, one or more single-core or multi-core processors. The baseband circuitry 2204 may include one or more baseband processors or control logic to process baseband signals received from a receive signal path of the RF circuitry 2206 and to generate baseband signals for a transmit signal path of the RF circuitry 2206. Baseband processing circuitry 2204 may interface with the application circuitry 2202 for generation and processing of the baseband signals and for controlling operations of the RF circuitry 2206. For example, in some embodiments, the baseband circuitry 2204 may include a third generation (3G) baseband processor 2204A, a fourth generation (4G) baseband processor 2204B, a fifth generation (5G) baseband processor 2204C, or other baseband processor(s) 2204D for other existing generations, generations in development or to be developed in the future (e.g., second generation (2G), sixth generation (6G), etc.). The baseband circuitry 2204 (e.g., one or more of baseband processors 2204A-D) may handle various radio control functions that enable communication with one or more radio networks via the RF circuitry 2206. In other embodiments, some or all of the functionality of baseband processors 2204A-D may be included in modules stored in the memory 2204G and executed via a Central Processing Unit (CPU) 2204E. The radio control functions may include, but are not limited to, signal modulation/demodulation, encoding/decoding, radio frequency shifting, etc. In some embodiments, modulation/demodulation circuitry of the baseband circuitry 2204 may include Fast-Fourier Transform (FFT), precoding, or constellation mapping/demapping functionality. In some embodiments, encoding/decoding circuitry of the baseband circuitry 2204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 2204 may include one or more audio digital signal processor(s) (DSP) 2204F. The audio DSP(s) 2204F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 2204 and the application circuitry 2202 may be implemented together such as, for example, on a system on a chip (SOC).

In some embodiments, the baseband circuitry 2204 may provide for communication compatible with one or more radio technologies. For example, in some embodiments, the baseband circuitry 2204 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 2204 is configured to support radio communications of more than one wireless protocol may be referred to as multi-mode baseband circuitry.

RF circuitry 2206 may enable communication with wireless networks using modulated electromagnetic radiation through a non-solid medium. In various embodiments, the RF circuitry 2206 may include switches, filters, amplifiers, etc. to facilitate the communication with the wireless network. RF circuitry 2206 may include a receive signal path which may include circuitry to down-convert RF signals received from the FEM circuitry 2208 and provide baseband signals to the baseband circuitry 2204. RF circuitry 2206 may also include a transmit signal path which may include circuitry to up-convert baseband signals provided by the baseband circuitry 2204 and provide RF output signals to the FEM circuitry 2208 for transmission.

In some embodiments, the receive signal path of the RF circuitry 2206 may include mixer circuitry 2206*a*, amplifier circuitry 2206*b* and filter circuitry 2206*c*. In some embodiments, the transmit signal path of the RF circuitry 2206 may include filter circuitry 2206*c* and mixer circuitry 2206*a*. RF circuitry 2206 may also include synthesizer circuitry 2206*d* for synthesizing a frequency for use by the mixer circuitry 2206*a* of the receive signal path and the transmit signal path. In some embodiments, the mixer circuitry 2206*a* of the receive signal path may be configured to down-convert RF signals received from the FEM circuitry 2208 based on the synthesized frequency provided by synthesizer circuitry 2206*d*. The amplifier circuitry 2206*b* may be configured to amplify the down-converted signals and the filter circuitry 2206*c* may be a low-pass filter (LPF) or band-pass filter (BPF) configured to remove unwanted signals from the down-converted signals to generate output baseband signals. Output baseband signals may be provided to the baseband circuitry 2204 for further processing. In some embodiments, the output baseband signals may be zero-frequency baseband signals, although this is not a requirement. In some embodiments, mixer circuitry 2206*a* of the receive signal path may comprise passive mixers, although the scope of the embodiments is not limited in this respect.

In some embodiments, the mixer circuitry 2206*a* of the transmit signal path may be configured to up-convert input baseband signals based on the synthesized frequency provided by the synthesizer circuitry 2206*d* to generate RF output signals for the FEM circuitry 2208. The baseband signals may be provided by the baseband circuitry 2204 and may be filtered by filter circuitry 2206*c*.

In some embodiments, the mixer circuitry 2206*a* of the receive signal path and the mixer circuitry 2206*a* of the transmit signal path may include two or more mixers and may be arranged for quadrature downconversion and upconversion, respectively. In some embodiments, the mixer circuitry 2206*a* of the receive signal path and the mixer circuitry 2206*a* of the transmit signal path may include two or more mixers and may be arranged for image rejection (e.g., Hartley image rejection). In some embodiments, the mixer circuitry 2206*a* of the receive signal path and the mixer circuitry 2206*a* may be arranged for direct downconversion and direct upconversion, respectively. In some embodiments, the mixer circuitry 2206*a* of the receive signal path and the mixer circuitry 2206*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 2206 may include analog-to-digital converter (ADC) and digital-to-analog converter (DAC) circuitry and the baseband circuitry 2204 may include a digital baseband interface to communicate with the RF circuitry 2206.

In some dual-mode embodiments, a separate radio IC circuitry may be provided for processing signals for each spectrum, although the scope of the embodiments is not limited in this respect.

In some embodiments, the synthesizer circuitry 2206*d* may be a fractional-N synthesizer or a fractional N/N+1 synthesizer, although the scope of the embodiments is not limited in this respect as other types of frequency synthesizers may be suitable. For example, synthesizer circuitry 2206*d* may be a delta-sigma synthesizer, a frequency multiplier, or a synthesizer comprising a phase-locked loop with a frequency divider.

The synthesizer circuitry 2206*d* may be configured to synthesize an output frequency for use by the mixer circuitry 2206*a* of the RF circuitry 2206 based on a frequency input and a divider control input. In some embodiments, the synthesizer circuitry 2206*d* may be a fractional N/N+1 synthesizer.

In some embodiments, frequency input may be provided by a voltage controlled oscillator (VCO), although that is not a requirement. Divider control input may be provided by either the baseband circuitry 2204 or the applications processor 2202 depending on the desired output frequency. In some embodiments, a divider control input (e.g., N) may be determined from a look-up table based on a channel indicated by the applications processor 2202.

Synthesizer circuitry 2206*d* of the RF circuitry 2206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 2206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 2206 may include an IQ/polar converter.

FEM circuitry 2208 may include a receive signal path which may include circuitry configured to operate on RF signals received from one or more antennas 2210, amplify the received signals and provide the amplified versions of the received signals to the RF circuitry 2206 for further processing. FEM circuitry 2208 may also include a transmit signal path which may include circuitry configured to amplify signals for transmission provided by the RF circuitry 2206 for transmission by one or more of the one or more antennas 2210. In various embodiments, the amplification through the transmit or receive signal paths may be done solely in the RF circuitry 2206, solely in the FEM 2208, or in both the RF circuitry 2206 and the FEM 2208.

In some embodiments, the FEM circuitry 2208 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 2206). The transmit signal path of the FEM circuitry 2208 may include a power amplifier (PA) to amplify input RF signals (e.g., provided by RF circuitry 2206), and one or more filters to generate RF signals for subsequent transmission (e.g., by one or more of the one or more antennas 2210).

In some embodiments, the PMC 2212 may manage power provided to the baseband circuitry 2204. In particular, the PMC 2212 may control power-source selection, voltage scaling, battery charging, or DC-to-DC conversion. The PMC 2212 may often be included when the device 2200 is capable of being powered by a battery, for example, when the device is included in a UE. The PMC 2212 may increase the power conversion efficiency while providing desirable implementation size and heat dissipation characteristics.

While FIG. 22 shows the PMC 2212 coupled only with the baseband circuitry 2204. However, in other embodiments, the PMC 7 12 may be additionally or alternatively coupled with, and perform similar power management operations for, other components such as, but not limited to, application circuitry 2202, RF circuitry 2206, or FEM 2208.

In some embodiments, the PMC 2212 may control, or otherwise be part of, various power saving mechanisms of the device 2200. For example, if the device 2200 is in an RRC_Connected state, where it is still connected to the RAN node as it expects to receive traffic shortly, then it may enter a state known as Discontinuous Reception Mode (DRX) after a period of inactivity. During this state, the device 2200 may power down for brief intervals of time and thus save power.

If there is no data traffic activity for an extended period of time, then the device 2200 may transition off to an RRC_Idle state, where it disconnects from the network and does not perform operations such as channel quality feedback, handover, etc. The device 2200 goes into a very low power state and it performs paging where again it periodically wakes up to listen to the network and then powers down again. The device 2200 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 2202 and processors of the baseband circuitry 2204 may be used to execute elements of one or more instances of a protocol stack. For example, processors of the baseband circuitry 2204, alone or in combination, may be used execute Layer 3, Layer 2, or Layer 1 functionality, while processors of the application circuitry 2204 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 23:
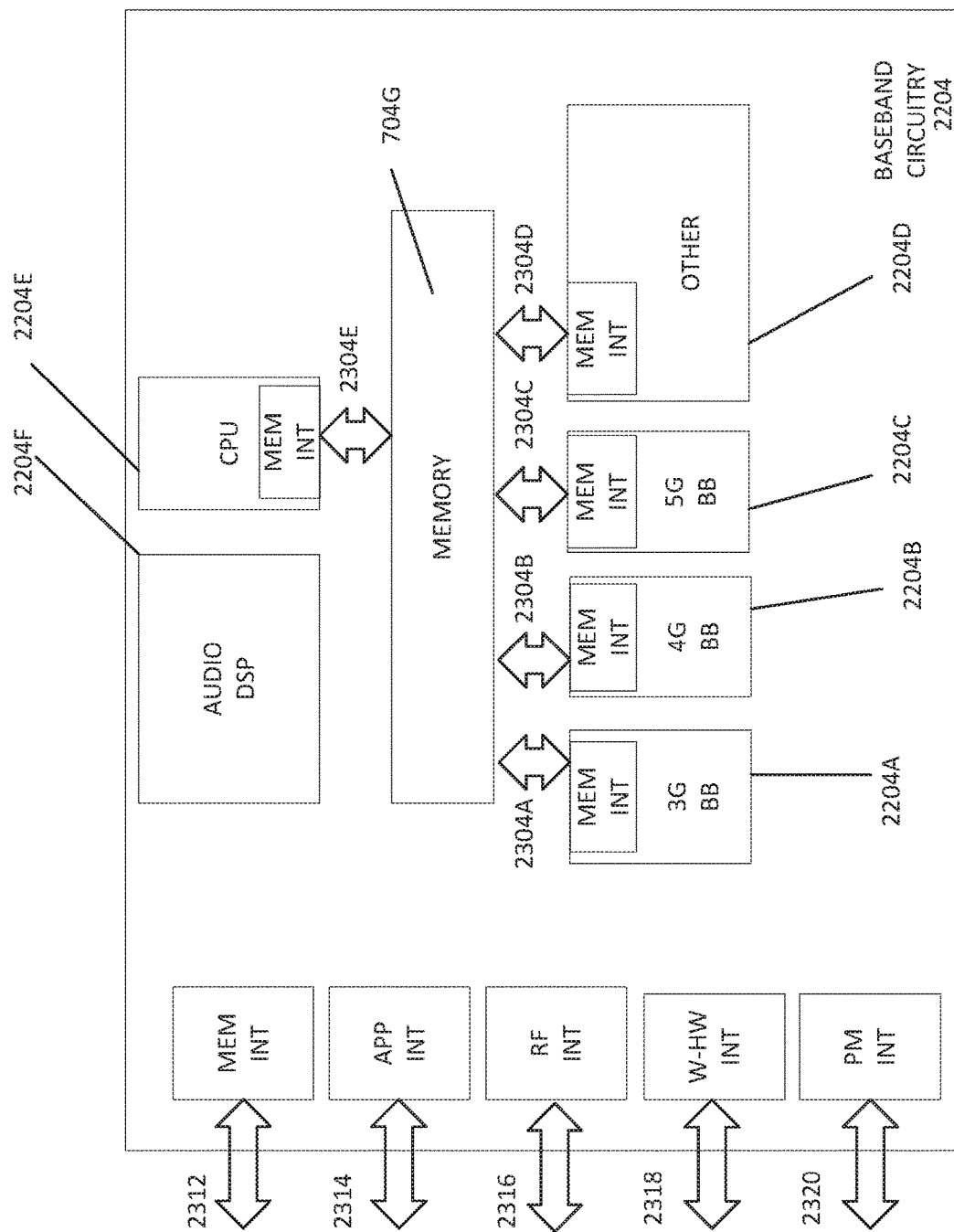
FIG. 23 illustrates example interfaces of baseband circuitry in accordance with some embodiments.

FIG. 23 illustrates example interfaces of baseband circuitry in accordance with some embodiments. As discussed above, the baseband circuitry 2204 of FIG. 22 may comprise processors 2204A-2204E and a memory 2204G utilized by said processors. Each of the processors 2204A-2204E may include a memory interface, 2304A-2304E, respectively, to send/receive data to/from the memory 2204G.

The baseband circuitry 2204 may further include one or more interfaces to communicatively couple to other circuitries/devices, such as a memory interface 2312 (e.g., an interface to send/receive data to/from memory external to the baseband circuitry 2204), an application circuitry interface 2314 (e.g., an interface to send/receive data to/from the application circuitry 2202 of FIG. 22), an RF circuitry interface 2316 (e.g., an interface to send/receive data to/from RF circuitry 2206 of FIG. 22), a wireless hardware connectivity interface 2318 (e.g., an interface to send/receive data to/from Near Field Communication (NFC) components, Bluetooth® components (e.g., Bluetooth® Low Energy), Wi-Fi® components, and other communication components), and a power management interface 2320 (e.g., an interface to send/receive power or control signals to/from the PMC 2212.

Figure 24:
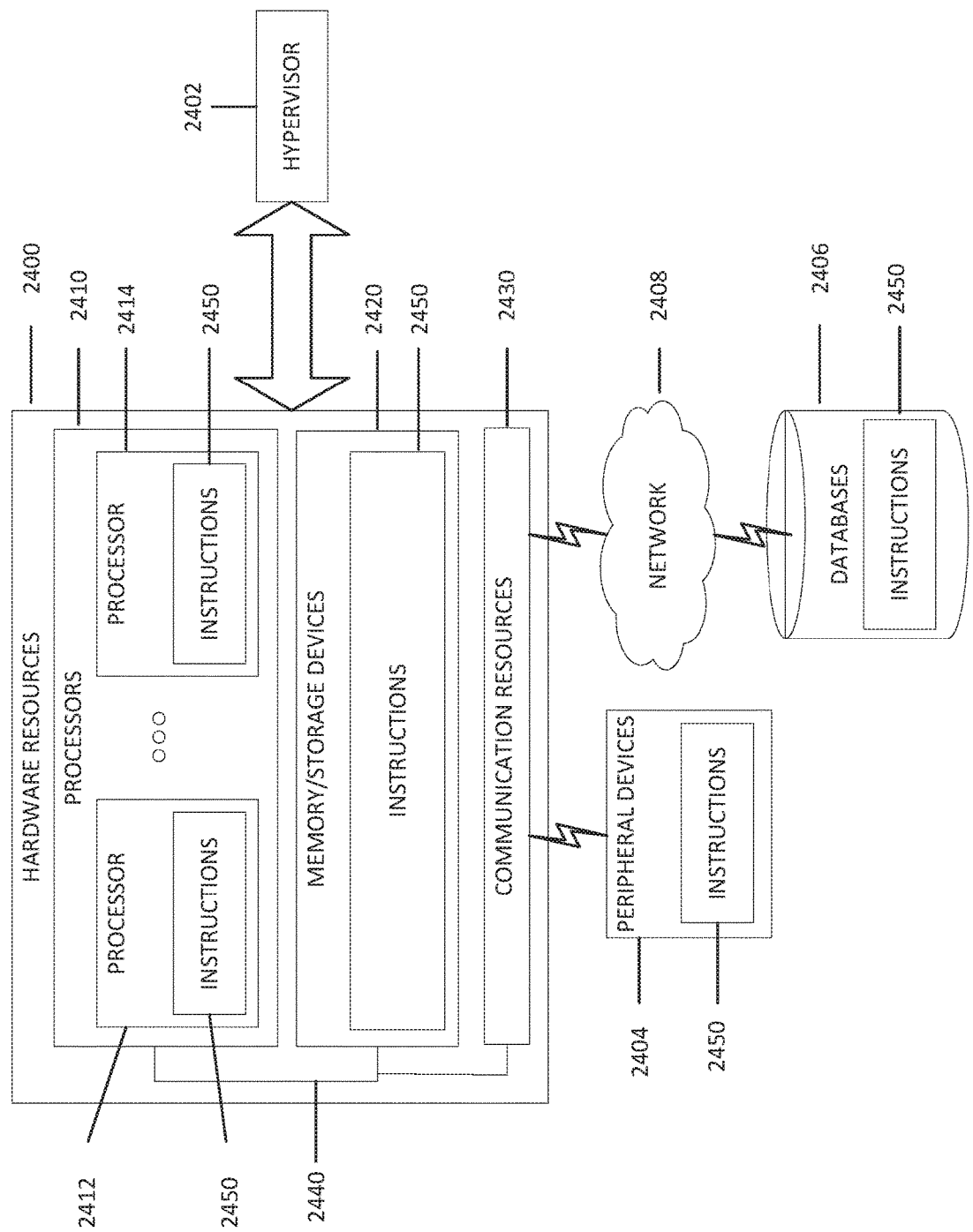
FIG. 24 is a block diagram illustrating components, according to some example embodiments, able to read instructions from a machine-readable or computer-readable medium and perform any one or more of the methodologies discussed herein.

FIG. 24 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 24 shows a diagrammatic representation of hardware resources 2400 including one or more processors (or processor cores) 2410, one or more memory/storage devices 2420, and one or more communication resources 2430, each of which may be communicatively coupled via a bus 2440. For embodiments where node virtualization (e.g., NFV) is utilized, a hypervisor 2402 may be executed to provide an execution environment for one or more network slices/sub-slices to utilize the hardware resources 2400.

The processors 2410 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 2412 and a processor 2414.

The memory/storage devices 2420 may include main memory, disk storage, or any suitable combination thereof. The memory/storage devices 2420 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 2430 may include interconnection or network interface components or other suitable devices to communicate with one or more peripheral devices 2404 or one or more databases 2406 via a network 2408. For example, the communication resources 2430 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 2450 may comprise software, a program, an application, an applet, an app, or other executable code for causing at least any of the processors 2410 to perform any one or more of the methodologies discussed herein. The instructions 2450 may reside, completely or partially, within at least one of the processors 2410 (e.g., within the processor's cache memory), the memory/storage devices 2420, or any suitable combination thereof. Furthermore, any portion of the instructions 2450 may be transferred to the hardware resources 2400 from any combination of the peripheral devices 2404 or the databases 2406. Accordingly, the memory of processors 2410, the memory/storage devices 2420, the peripheral devices 2404, and the databases 2406 are examples of computer-readable and machine-readable media.

The following paragraphs describe examples of various embodiments.

Example 1 may include an apparatus for a Next Generation NodeB (gNB), comprising processing circuitry configured to: generate Downlink Control Information (DCI) payload for a NR-Physical Downlink Control Channel (NR-PDCCH); attach Cyclic Redundancy Check (CRC) to the DCI payload; mask the CRC with an Radio Network Temporary Identifier (RNTI) using a bitwise modulus 2 addition operation, wherein the number of bits for the RNTI is different from the number of bits for the CRC; and perform polar encoding for the DCI payload with the masked CRC.

Example 2 may include the apparatus of Example 1, wherein when the number of bits for the RNTI is less than the number of bits for the CRC, a predetermined sequence is appended prior to the RNTI bits such that the number of bits for the RNTI appended with the predetermined sequence is equal to the number of bits for the CRC.

Example 3 may include the apparatus of Example 1, wherein when the number of bits for the RNTI is less than the number of bits for the CRC, a predetermined sequence is appended after the RNTI bits such that the number of bits for the RNTI appended with the predetermined sequence is equal to the number of bits for the CRC.

Example 4 may include the apparatus of Example 1, wherein when the number of bits for the RNTI is less than the number of bits for the CRC, the RNTI is extended by repeating a plurality of the RNTI bits.

Example 5 may include the apparatus of Example 2 or 3, the predetermined sequence is an all zero sequence.

Example 6 may include the apparatus of Example 1, wherein when the number of bits for the RNTI is larger than the number of bits for the CRC, the CRC is masked with a portion of the RNTI, the portion of the RNTI has a same bit number with the CRC.

Example 7 may include the apparatus of Example 6, wherein the portion of the RNTI is the MSB bits of the RNTI.

Example 8 may include the apparatus of Example 6, wherein the portion of the RNTI is the LSB bits of the RNTI.

Example 9 may include the apparatus of Example 6, wherein the portion of the RNTI is selected with a hashing function.

Example 10 may include the apparatus of Example 1, wherein the RNTI is masked onto a portion of the CRC which appears relatively later in the decoding order of Polar decoding.

Example 11 may include the apparatus of Example 1, wherein a first portion of the RNTI is masked onto a portion of the CRC, and a second portion of the RNTI is embedded explicitly in the DCI payload.

Example 12 may include the apparatus of Example 1, wherein the RNTI comprises a first RNTI and a second RNTI, at least a portion of the first RNTI is embedded into one or more frozen bits applied for Polar encoding, and at least a portion of the second RNTI is masked onto the CRC.

Example 13 may include the apparatus of Example 12, wherein the portion of the first RNTI is embedded into the one or more frozen bits via a scrambling initializer, wherein the scrambling initializer operates based on the following parameters: a cell ID, a slot index, one or more parameters associated with the control resource set (CORESET) in which the NR PDCCH is located.

Example 14 may include the apparatus of Example 1, the processing circuitry is further configured to: apply a scrambling function after Polar encoding of the DCI payload with the masked CRC, where the scrambling function is a linear or a non-linear function of one or more of the RNTI, a cell identifier, a slot or subframe or System Frame Number (SFN) index, and a CORESET index.

Example 15 may include an apparatus for a Next Generation NodeB (gNB), comprising processing circuitry configured to: generate a Demodulation Reference Signal (DMRS) sequence based on a Pseudo-Noise (PN) sequence; and map the generated DMRS sequence onto a configured control resource set (CORESET) starting from the PRB of the lowest frequency and mapping to resources in units of PRBs in an increasing frequency order.

Example 16 may include the apparatus of Example 15, the length of the generated DMRS sequence is determined by the maximum number of Physical resource blocks (PRBs) supported for a given subcarrier spacing of the configured CORESET.

Example 17 may include the apparatus of Example 15, wherein the length of the generated DMRS sequence is determined based on the maximum number of PRBs supported for a given subcarrier spacing and the number of OFDM symbols of the configured CORESET.

Example 18 may include the apparatus of Example 16 or 17, wherein the maximum number of PRB supported for given subcarrier spacing is derived by the number of common PRBs within the system bandwidth for the given subcarrier spacing.

Example 19 may include the apparatus of Example 15, wherein the length of the generated DMRS sequence is determined based on the number of PRBs within the Bandwidth Part (BWP) that contains the configured CORESET.

Example 20 may include the apparatus of Example 15, the length of the generated DMRS sequence is determined based on the number of PRBs within the BWP that contains the configured CORESET and the number of OFDM symbols of the configured CORESET.

Example 21 may include the apparatus of Example 15, wherein an initialization seed of the PN sequence is defined as a function of one or more of: symbol index, slot index, mini-slot index, starting symbol index of the configured CORESET, antenna port identity (AP ID), and CORESET-specific parameter configured by higher layers.

Example 22 may include the apparatus of Example 15, the processing circuitry is further configured to: generate the DMRS sequence based on the PN sequence and a scrambling sequence, wherein the PN sequence is based on a first index, and the scrambling sequence is based on a second index.

Example 23 may include the apparatus of Example 15, wherein when the configured CORESET spans one symbol, the generated DMRS sequence is mapped into the configured CORESET in a frequency first mapping manner.

Example 24 may include the apparatus of Example 15, wherein when the configured CORESET spans multiple symbols, the generated DMRS sequence is mapped into the configured CORESET in a time first mapping or frequency first mapping manner.

Example 25 may include an apparatus for a User Equipment (UE), comprising processing circuitry configured to: acquire information of control resource configuration associated with the UE, wherein the control resource configuration comprising one or more identifiers; acquire information of search space configuration of the UE which is associated with the control resource configuration, wherein the search space information may include a field indicating a first identifier of the one or more identifiers applied for determining at least one control resource candidate for the search space, and a field indicating a second identifier of the one or more identifiers applied for scrambling initialization of the at least one control resource candidate of the search space; determine the at least one control resource candidate based on the first identifier; determine the scrambling initialization for the at least one control resource candidate of the search space based on the second identifier; descramble the at least one control resource candidate of the search space based on the determined scrambling initialization; and decode said descrambled control resource candidate of the search space.

Example 26 may include the apparatus of Example 25, wherein the first identifier is a Cell-Radio Network Temporary Identifier (C-RNTI) and second identifier is a virtual cell identifier.

Example 27 may include the apparatus of Example 25, wherein the first identifier is a Cell-Radio Network Temporary Identifier (C-RNTI) and second identifier is either a virtual cell identifier or a scrambling-RNTI, wherein the second identifier is determined from the control resource configuration.

Example 28 may include the apparatus of Example 25, wherein the search space configuration further comprises a field indicating a third identifier of the one or more identifiers applied for Demodulation Reference Signal (DMRS) generation associated with at least one control resource candidate of the search space.

Example 29 may include the apparatus of Example 25, the circuitry is further configured to generate the DMRS associated with the at least one control resource candidate of the search space based on the third identifier.

Example 30 may include the apparatus of Example 28 or 29, the first identifier and second identifier are identical and the third identifier is different than the first identifier.

Example 31 may include the apparatus of Example 28 or 29, the first identifier, the second identifier and the third identifier are identical.

Example 32 may include an apparatus for a Next Generation NodeB (gNB), comprising a Radio Frequency (RF) interface; and processing circuitry configured to: determine control resource configuration associated a User Equipment (UE), wherein the control resource information comprising one or more identifiers; determine search space configuration of the UE which is associated with the control resource information, wherein the search space configuration comprises a field indicating a first identifier of the one or more identifiers applied for determining at least one control resource candidate for the search space, and a field indication a second identifier of the one or more identifiers applied for scrambling initialization of the at least one control resource candidate of the search space; encode the at least one control resource candidate of the search space with the first identifier determine the scrambling initialization for the at least one control resource candidate of the search space based on the second identifier; scramble control information for the UE based on the determined scrambling initialization; and transmit the scrambled control information on the at least one control resource candidate of the search space via the RF interface.

Example 33 may include the apparatus of Example 32, wherein the first identifier is a Cell-Radio Network Temporary Identifier (C-RNTI) and the second identifier is a virtual cell identifier Example 34 may include the apparatus of Example 32, wherein the first identifier is a Cell-Radio Network Temporary Identifier (C-RNTI) and second identifier is either a virtual cell identifier or a scrambling-RNTI, wherein the second identifier is determined from the control resource configuration.

Example 35 may include the apparatus of Example 32, wherein the search space configuration further comprises a field indicating a third identifier of the one or more identifiers applied for Demodulation Reference Signal (DMRS) generation associated with the at least one control resource candidate of the search space.

Example 36 may include the apparatus of Example 35, the processing circuitry is further configured to: generate the DMRS associated with the at least one control resource candidate of the search space based on the third identifier.

Example 37 may include the apparatus of Example 35 or 36, the first identifier and second identifier are identical and the third identifier is different than the first identifier.

Example 38 may include the apparatus of Example 35 or 36, the first identifier, the second identifier and the third identifier are identical.

Example 39 may include an apparatus for a Next Generation NodeB (gNB), comprising a Radio Frequency (RF) interface; and processing circuitry configured to: generate an information block for Physical Broadcast Channel (PBCH); attach the information block with Cyclic Redundancy Check (CRC) bits; interleave the information block attached with the CRC bits to enable early decoding of a part of the information block at User Equipment (UE) side, wherein the part of the information block is portion of Synchronization Signal (SS) block index; encode the interleaved information block with Polar codes; and transmit the encoded information block via the RF interface for decoding at UE side.

Example 40 may include the apparatus of Example 39, the processing circuitry is further configured to: dispose the bits corresponding to the part of the information block at relatively early positions in the interleaved information block.

Example 41 may include the apparatus of Example 39, the processing circuitry is further configured to: dispose the bits corresponding to the part of the information block at positions in Polar encoding which correspond to relatively early positions in the decoding order for Polar decoding.

Example 42 may include the apparatus of Example 39, the processing circuitry is further configured to: dispose the bits corresponding to the part of information block and at least portion of CRC at relatively early positions in the interleaved information block.

Example 43 may include the apparatus of Example 39, the processing circuitry is further configured to: dispose the bits corresponding to the part of the information block and at least a part of the CRC bits at positions in Polar encoding which correspond to relatively early positions in the decoding order for Polar decoding.

Example 44 may include an apparatus for a User Equipment (UE), comprising a Radio Frequency (RF) interface; and processing circuitry configured to: receive an information block for Physical Broadcast Channel (PBCH) which is encoded with Polar codes from a Next Generation NodeB (gNB); decode the information block in a decoding order to obtain an estimate of a part of the information block, wherein the part of the information block is portion of a Synchronization Signal (SS) block index; and stop decoding of the remaining portion of the information block after the estimate of the part of information block is obtained.

Example 45 may include the apparatus of Example 44, the processing circuitry is further configured to: obtain a set of log-likelihood ratios (LLRs) corresponding to the information block; partially decode the received LLRs to obtain one or more candidate decoding paths corresponding to the part of the information block; select a candidate decoding path from the one or more candidate decoding paths based on a selection criteria; and output the estimate of the part of the information block based on the selected decoding path.

Example 46 may include the apparatus of Example 45, the selection criteria is based on polar decoder path metric.

Example 47 may include the apparatus of Example 45, the selection criteria is based on polar decoder path metric and CRC checking.

Example 48 may include the apparatus of Example 47, wherein the CRC checking is based on partial CRC check bit estimates that are also obtained based on the partial decoding.

Example 49 may include a method performed by a Next Generation NodeB (gNB), comprising: generating Downlink Control Information (DCI) payload for a NR-Physical Downlink Control Channel (NR-PDCCH); attaching Cyclic Redundancy Check (CRC) to the DCI payload; masking the CRC with an Radio Network Temporary Identifier (RNTI) using a bitwise modulus 2 addition operation, wherein the number of bits for the RNTI is different from the number of bits for the CRC; and performing polar encoding for the DCI payload with the masked CRC.

Example 50 may include the method of Example 49, wherein when the number of bits for the RNTI is less than the number of bits for the CRC, a predetermined sequence is appended prior to the RNTI bits such that the number of bits for the RNTI appended with the predetermined sequence is equal to the number of bits for the CRC.

Example 51 may include the method of Example 49, wherein when the number of bits for the RNTI is less than the number of bits for the CRC, a predetermined sequence is appended after the RNTI bits such that the number of bits for the RNTI appended with the predetermined sequence is equal to the number of bits for the CRC Example 52 may include the method of Example 49, wherein when the number of bits for the RNTI is less than the number of bits for the CRC, the RNTI is extended by repeating a plurality of the RNTI bits.

Example 53 may include the method of Example 50 or 51, wherein the predetermined sequence is an all zero sequence.

Example 54 may include the method of Example 49, wherein when the number of bits for the RNTI is larger than the number of bits for the CRC, the CRC is masked with a portion of the RNTI, the portion of the RNTI has a same bit number with the CRC.

Example 55 may include the method of Example 54, wherein the portion of the RNTI is the MSB bits of the RNTI.

Example 56 may include the method of Example 54, wherein the portion of the RNTI is the LSB bits of the RNTI.

Example 57 may include the method of Example 54, wherein the portion of the RNTI is selected with a hashing function.

Example 58 may include the method of Example 49, wherein the RNTI is masked onto a portion of the CRC which appears relatively later in the decoding order of Polar decoding.

Example 59 may include the method of Example 49, wherein a first portion of the RNTI is masked onto a portion of the CRC, and a second portion of the RNTI is embedded explicitly in the DCI payload.

Example 60 may include the method of Example 49, wherein the RNTI comprises a first RNTI and a second RNTI, at least a portion of the first RNTI is embedded into one or more frozen bits applied for Polar encoding, and at least a portion of the second RNTI is masked onto the CRC.

Example 61 may include the method of Example 60, wherein the portion of the first RNTI is embedded into the one or more frozen bits via a scrambling initializer, wherein the scrambling initializer operates based on the following parameters: a cell ID, a slot index, one or more parameters associated with the control resource set (CORESET) in which the NR PDCCH is located.

Example 62 may include the method of Example 49, further comprising: applying a scrambling function after Polar encoding of the DCI payload with the masked CRC, where the scrambling function is a linear or a non-linear function of one or more of the RNTI, a cell identifier, a slot or subframe or System Frame Number (SFN) index, and a CORESET index.

Example 63 may include a method performed by a Next Generation NodeB (gNB), comprising: generating a Demodulation Reference Signal (DMRS) sequence based on a Pseudo-Noise (PN) sequence; and mapping the generated DMRS sequence onto a configured control resource set (CORESET) starting from the PRB of the lowest frequency and mapping to resources in units of PRBs in an increasing frequency order.

Example 64 may include the method of Example 63, the length of the generated DMRS sequence is determined by the maximum number of Physical resource blocks (PRBs) supported for a given subcarrier spacing of the configured CORESET.

Example 65 may include the method of Example 63, wherein the length of the generated DMRS sequence is determined based on the maximum number of PRBs supported for a given subcarrier spacing and the number of OFDM symbols of the configured CORESET.

Example 66 may include the method of Example 64 or 65, wherein the maximum number of PRB supported for given subcarrier spacing is derived by the number of common PRBs within the system bandwidth for the given subcarrier spacing.

Example 67 may include the method of Example 63, wherein the length of the generated DMRS sequence is determined based on the number of PRBs within the Bandwidth Part (BWP) that contains the configured CORESET.

Example 68 may include the method of Example 63, the length of the generated DMRS sequence is determined based on the number of PRBs within the BWP that contains the configured CORESET and the number of OFDM symbols of the configured CORESET.

Example 69 may include the method of Example 63, wherein an initialization seed of the PN sequence is defined as a function of one or more of: symbol index, slot index, mini-slot index, starting symbol index of the configured CORESET, antenna port identity (AP ID), and CORESET-specific parameter configured by higher layers.

Example 70 may include the method of Example 63, wherein generating the DMRS sequence based on the PN sequence further comprises: generating the DMRS sequence based on the PN sequence and a scrambling sequence, wherein the PN sequence is based on a first index, and the scrambling sequence is based on a second index.

Example 71 may include the method of Example 63, wherein when the configured CORESET spans one symbol, the generated DMRS sequence is mapped into the configured CORESET in a frequency first mapping manner.

Example 72 may include the method of Example 63, wherein when the configured CORESET spans multiple symbols, the generated DMRS sequence is mapped into the configured CORESET in a time first mapping or frequency first mapping manner.

Example 73 may include a method performed by a User Equipment (UE), comprising: acquiring information of control resource configuration associated with the UE, wherein the control resource configuration comprising one or more identifiers; acquiring information of search space configuration of the UE which is associated with the control resource configuration, wherein the search space information may include a field indicating a first identifier of the one or more identifiers applied for determining at least one control resource candidate for the search space, and a field indicating a second identifier of the one or more identifiers applied for scrambling initialization of the at least one control resource candidate of the search space; determining the at least one control resource candidate based on the first identifier; determining the scrambling initialization for the at least one control resource candidate of the search space based on the second identifier; descrambling the at least one control resource candidate of the search space based on the determined scrambling initialization; and decoding said descrambled control resource candidate of the search space.

Example 74 may include the method of Example 73, wherein the first identifier is a Cell-Radio Network Temporary Identifier (C-RNTI) and second identifier is a virtual cell identifier.

Example 75 may include the method of Example 73, wherein the first identifier is a Cell-Radio Network Temporary Identifier (C-RNTI) and second identifier is either a virtual cell identifier or a scrambling-RNTI, wherein the second identifier is determined from the control resource configuration.

Example 76 may include the method of Example 73, wherein the search space configuration further comprises a field indicating a third identifier of the one or more identifiers applied for Demodulation Reference Signal (DMRS) generation associated with at least one control resource candidate of the search space.

Example 77 may include the method of Example 76, further comprising: generating the DMRS associated with the at least one control resource candidate of the search space based on the third identifier.

Example 78 may include the method of Example 76 or 77, the first identifier and second identifier are identical and the third identifier is different than the first identifier.

Example 79 may include the method of Example 76 or 77, the first identifier, the second identifier and the third identifier are identical.

Example 80 may include a method performed by a Next Generation NodeB (gNB), comprising: determining control resource configuration associated a User Equipment (UE), wherein the control resource information comprising one or more identifiers; determining search space configuration of the UE which is associated with the control resource information, wherein the search space configuration comprises a field indicating a first identifier of the one or more identifiers applied for determining at least one control resource candidate for the search space, and a field indication a second identifier of the one or more identifiers applied for scrambling initialization of the at least one control resource candidate of the search space; encoding the at least one control resource candidate of the search space with the first identifier; determining the scrambling initialization for the at least one control resource candidate of the search space based on the second identifier; scrambling control information for the UE based on the determined scrambling initialization; and transmitting the scrambled control information on the at least one control resource candidate of the search space to the UE.

Example 81 may include the method of Example 80, wherein the first identifier is a Cell-Radio Network Temporary Identifier (C-RNTI) and the second identifier is a virtual cell identifier.

Example 82 may include the method of Example 80, wherein the first identifier is a Cell-Radio Network Temporary Identifier (C-RNTI) and second identifier is either a virtual cell identifier or a scrambling-RNTI, wherein the second identifier is determined from the control resource configuration.

Example 83 may include the method of Example 80, wherein the search space configuration further comprises a field indicating a third identifier of the one or more identifiers applied for Demodulation Reference Signal (DMRS) generation associated with the at least one control resource candidate of the search space.

Example 84 may include the method of Example 83, further comprising: generating the DMRS associated with the at least one control resource candidate of the search space based on the third identifier.

Example 85 may include the method of Example 83 or 84, the first identifier and second identifier are identical and the third identifier is different than the first identifier.

Example 86 may include the method of Example 83 or 84, the first identifier, the second identifier and the third identifier are identical.

Example 87 may include a method performed at a Next Generation NodeB (gNB), comprising: generating an information block for Physical Broadcast Channel (PBCH); attaching the information block with Cyclic Redundancy Check (CRC) bits; interleaving, by an interleaver of the gNB, the information block attached with the CRC bits to enable early decoding of a part of the information block at User Equipment (UE) side, wherein the part of the information block is portion of Synchronization Signal (SS) block index; encoding, by a Polar encoder of the gNB, the interleaved information block; and transmitting the encoded information block for decoding at UE side.

Example 88 may include the method of Example 87, wherein interleaving the information block attached with the CRC bits comprising: disposing the bits corresponding to the part of the information block at relatively early positions in the interleaved information block.

Example 89 may include the method of Example 87, wherein interleaving the information block attached with the CRC bits comprising: disposing the bits corresponding to the part of the information block at positions in Polar encoding which correspond to relatively early positions in the decoding order for Polar decoding.

Example 90 may include the method of Example 87, wherein interleaving the information block attached with the CRC bits comprising: disposing the bits corresponding to the part of information block and at least portion of CRC at relatively early positions in the interleaved information block.

Example 91 may include the method of Example 87, wherein interleaving the information block attached with the CRC bits comprising: disposing the bits corresponding to the part of the information block and at least a part of the CRC bits at positions in Polar encoding which correspond to relatively early positions in the decoding order for Polar decoding.

Example 92 may include a method performed at a User Equipment (UE), comprising: receiving an information block for Physical Broadcast Channel (PBCH) from a Next Generation NodeB (gNB); decoding, by a polar decoder of the UE, the information block in a decoding order to obtain an estimate of a part of the information block, wherein the part of the information block is portion of a Synchronization Signal (SS) block index; and stopping decoding of the remaining portion of the information block after the estimate of the part of information block is obtained.

Example 93 may include the method of Example 92, wherein decoding the information block in the decoding order to obtain the estimate of the part of the information block further comprises: receiving a set of log-likelihood ratios (LLRs) corresponding to the information block; partially decoding the received LLRs to obtain one or more candidate decoding paths corresponding to the part of the information block; selecting a candidate decoding path from the one or more candidate decoding paths based on a selection criteria; and outputting the estimate of the part of the information block based on the selected decoding path.

Example 94 may include the method of Example 93, the selection criteria is based on polar decoder path metric.

Example 95 may include the method of Example 93, the selection criteria is based on polar decoder path metric and CRC checking.

Example 96 may include the method of Example 95, wherein the CRC checking is based on partial CRC check bit estimates that are also obtained based on the partial decoding.

Example 97 may include a computer-readable medium having instructions stored thereon, the instructions when executed by one or more processor(s) causing the processor(s) to perform the method of any of Examples 49-62.

Example 98 may include an apparatus for a Next Generation NodeB (gNB), including means for performing the actions of the method of any of Examples 49-62.

Example 99 may include a computer-readable medium having instructions stored thereon, the instructions when executed by one or more processor(s) causing the processor(s) to perform the method of any of Examples 63-72.

Example 100 may include an apparatus for a Next Generation NodeB (gNB), including means for performing the actions of the method of any of Examples 63-72.

Example 101 may include a computer-readable medium having instructions stored thereon, the instructions when executed by one or more processor(s) causing the processor(s) to perform the method of any of Examples 73-79.

Example 102 may include an apparatus for a User Equipment (UE), including means for performing the actions of the method of any of Examples 73-79.

Example 103 may include a computer-readable medium having instructions stored thereon, the instructions when executed by one or more processor(s) causing the processor(s) to perform the method of any of Examples 80-86.

Example 104 may include an apparatus for a Next Generation NodeB (gNB), including means for performing the actions of the method of any of Examples 80-86.

Example 105 may include a computer-readable medium having instructions stored thereon, the instructions when executed by one or more processor(s) causing the processor(s) to perform the method of any of Examples 87-91.

Example 106 may include an apparatus for a Next Generation NodeB (gNB), including means for performing the actions of the method of any of Examples 87-91.

Example 107 may include a computer-readable medium having instructions stored thereon, the instructions when executed by one or more processor(s) causing the processor(s) to perform the method of any of Examples 92-96.

Example 108 may include an apparatus for a User Equipment (UE), including means for performing the actions of the method of any of Examples 92-96.

Example 109 may include a User Equipment (UE) as shown and described in the description.

Example 110 may include a Next Generation NodeB (gNB) as shown and described in the description.

Example 111 may include a method performed at a User Equipment (UE) as shown and described in the description.

Example 112 may include a method performed at a Next Generation NodeB (gNB) as shown and described in the description.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is mani-

What is claimed is:

1. An apparatus comprising processing circuitry, wherein the processing circuitry is configured to:
   receive a downlink signal from a control resource set (CORESET), wherein a demodulation reference signal (DMRS) sequence has been mapped, according to a frequency-first mapping, onto resource elements occurring in one or more physical resource blocks (PRBs) and one or more Orthogonal Frequency Division Multiplexing (OFDM) symbols of the CORESET, wherein the DMRS sequence is based on a pseudo-noise (PN) sequence, wherein an initialization of the PN sequence is a function at least of a parameter for the CORESET and one or more indices corresponding respectively to the one or more OFDM symbols; and
   recover the DMRS sequence from the downlink signal.

2. The apparatus of claim 1, wherein the initialization of the PN sequence is further a function of a slot index.

3. The apparatus of claim 1, wherein a length of the DMRS sequence is determined based at least in part on a maximum number of PRBs supported for a subcarrier spacing of the CORESET.

4. The apparatus of claim 3, wherein said maximum number is derived from a number of common PRBs within a system bandwidth for the subcarrier spacing.

5. The apparatus of claim 1, wherein a length of the DMRS sequence is determined based at least in part on a number of PRBs within a bandwidth part (BWP) that contains the CORESET.

6. The apparatus of claim 1, wherein the downlink signal is according to New Radio.

7. The apparatus of claim 1, wherein the CORESET is configured by one or more higher layers of a protocol stack.

8. The apparatus of claim 1, further comprising:
   a transceiver coupled to the processing circuitry, and configured to transmit and receive radio signals.

9. A method, comprising:
   generating a demodulation reference signal (DMRS) sequence based on a pseudo-noise (PN) sequence;
   mapping the DMRS sequence onto resource elements (REs) of a control resource set (CORESET), according to a frequency first mapping for one or more physical resource blocks (PRBs) and one or more orthogonal frequency division multiplexing (OFDM) symbols, wherein initialization of the PN sequence is a function at least of a parameter for the CORESET and one or more indices corresponding respectively to the one or more OFDM symbols; and
   transmitting the DMRS sequence on the REs of the CORESET.

10. The method of claim 9, wherein a length of the DMRS sequence is determined based on a number of said one or more PRBs multiplied by a number of said REs per resource element group (REG), wherein the number of DMRS REs per REG is 3.

11. The method of claim 9, wherein elements of the DMRS sequence are mapped to every fourth subcarrier in the one or more PRBs.

12. The method of claim 9, wherein a common PRB indexing is used for a given subcarrier spacing within the CORESET.

13. The method of claim 9, wherein the parameter for the CORESET is configured.

14. The method of claim 9, wherein the initialization of the PN sequence is further a function of a slot index.

15. A method, comprising:
   receiving a downlink signal from a control resource set (CORESET), wherein a demodulation reference signal (DMRS) sequence has been mapped, according to a frequency-first mapping, onto resource elements occurring in one or more physical resource blocks (PRBs) and one or more Orthogonal Frequency Division Multiplexing (OFDM) symbols of the CORESET, wherein the DMRS sequence is based on a pseudo-noise (PN) sequence, wherein an initialization of the PN sequence is a function at least of a parameter for the CORESET and one or more indices corresponding respectively to the one or more OFDM symbols; and
   recovering the DMRS sequence from the downlink signal.

16. The method of claim 15, wherein the initialization of the PN sequence is further a function of a slot index.

17. The method of claim 15, wherein a length of the DMRS sequence is determined based at least in part on a maximum number of PRBs supported for a subcarrier spacing of the CORESET.

18. The method of claim 17, wherein said maximum number is derived from a number of common PRBs within a system bandwidth for the subcarrier spacing.

19. The method of claim 15, wherein a length of the DMRS sequence is determined based at least in part on a number of PRBs within a bandwidth part (BWP) that contains the CORESET.

20. The method of claim 15, wherein downlink signal is according to New Radio.

* * * * *